(12) United States Patent
Umebayashi et al.

(10) Patent No.: US 7,234,516 B2
(45) Date of Patent: Jun. 26, 2007

(54) AIR CONDITIONER FOR VEHICLE USE

(75) Inventors: Makoto Umebayashi, Chiryu (JP);
Yoshinori Yanagimachi, Takahama
(JP); Tomohiro Inada, Kariya (JP)

(73) Assignee: DENSO Corporation, Kariya (JP)

( * ) Notice: Subject to any disclaimer, the term of this patent is extended or adjusted under 35 U.S.C. 154(b) by 535 days.

(21) Appl. No.: 10/767,969

(22) Filed: Jan. 28, 2004

(65) Prior Publication Data
US 2004/0194913 A1    Oct. 7, 2004

(30) Foreign Application Priority Data
Jan. 31, 2003  (JP)  ............... 2003-023942
Nov. 17, 2003  (JP)  ............... 2003-386252

(51) Int. Cl.
*F25B 29/00*  (2006.01)
*B60H 1/00*   (2006.01)
*B60H 3/00*   (2006.01)

(52) U.S. Cl. ............... 165/202; 165/231; 165/232; 165/42; 165/43; 165/103; 62/133; 62/150; 62/158; 62/182; 62/282; 62/244

(58) Field of Classification Search ............... 165/202, 165/42, 43, 231, 232, 233, 103; 62/133, 62/150, 158, 182, 282, 244
See application file for complete search history.

(56) References Cited

U.S. PATENT DOCUMENTS 5,899,082 A * 5/1999 Stein et al. ............... 62/133
6,658,871 B1* 12/2003 Stein ............... 62/150

FOREIGN PATENT DOCUMENTS

| JP | 62152918 A | * | 7/1987 |
| JP | 05069741 A | * | 3/1993 |
| JP | 11-129729 |   | 5/1999 |

* cited by examiner

*Primary Examiner*—John K. Ford
(74) *Attorney, Agent, or Firm*—Harness, Dickey & Pierce, PLC

(57) ABSTRACT

When it is assumed that a vehicle is stopped or parked after its engine was stopped and a predetermined period of time has passed, a cold wind side air mixing door, hot wind side air mixing door, cold wind door and rear cold wind side air mixing door are totally closed and a blower is operated for a predetermined period of time. Accordingly, while a cooler is being dried, drying air containing much offensive smell components, which has passed through the cooler, is discharged outside the vehicle. Therefore, it is unnecessary to provide an exclusively used air passage and an opening and closing door for opening and closing the air passage used for composing an air blowing passage to dry the cooler. By utilizing the existing equipment, air used for drying, which has passed through the cooler, containing much offensive smell components can be discharged outside the vehicle.

9 Claims, 23 Drawing Sheets

AIR CONDITIONER FOR VEHICLE USE

BACKGROUND OF THE INVENTION

1. Field of the Invention

The present invention relates to an air conditioner for vehicle use.

2. Description of the Related Art

In order to reduce the generation of an offensive smell of a wind blown out from an air conditioner, it is conventional that air is blown to an evaporator and then the air is discharged outside a passenger compartment for a predetermined period of time from the start of operation of the air conditioner or for a predetermined period of time from the stoppage of operation of the air conditioner so as to dry the evaporator and remove moisture of condensed water from a surface of the evaporator.

However, according to the above invention, the following problems may be encountered. In order to compose a wind passage in which a wind flows to dry the evaporator, an exclusively used air passage and an opening and closing door for opening and closing the air passage are provided. Therefore, a size of the air conditioner (air conditioner casing) is increased and, further, the structure becomes complicated, which raises the manufacturing cost of the air conditioner.

SUMMARY OF THE INVENTION

In view of the above points, the first object of the present invention is to provide a new air conditioner, the structure of which is different from that of a conventional air conditioner. The second object of the present invention is to provide an air conditioner in which an offensive smell of the air-conditioned wind blown out from the air conditioner can be suppressed while an increase in the manufacturing cost of the air conditioner (air conditioner casing) is prevented.

In order to accomplish the above object, according to a first aspect of the present invention, there is provided an air conditioner for vehicle use comprising: a blower (21) for blowing air into a vehicle compartment; a cooler (2) for cooling the air which has been blown by the blower (21); a heater (3) for heating the air which has been blown by the blower (21); an air conditioning casing (4) for accommodating the cooler (2) and heater (3), having a heater bypass passage (5) to make a detour of the heater (3) so as to let the air flow to the downstream side; a cold wind side air mixing door (6) for controlling a state of communication of the heater bypass passage (5), the cold wind side air mixing door (6) being provided in the air conditioning casing (4); and a hot wind side air mixing door (7) for controlling a quantity of the wind passing through the heater (3), the hot wind side air mixing door (7) being provided in the air conditioning casing (4), wherein the cooler (2) is arranged on the upstream side of the air flow of the heater (3) and the entrance portion of the heater bypass passage (5), the air conditioner for vehicle use further comprising: a communicating port (15) for communicating the inside with the outside of the air conditioning casing (4), the communicating port (15) being arranged in the air conditioning casing (4) on the upstream side of the air flow of the heater (3) and the entrance portion of the heater bypass passage (5); and an air blowing control means (S3, S4, S13, S14, S23, S24, S33, S34) for conducting an air blowing mode in which the blower (21) is operated under the condition that both the air mixing doors (6, 7) are closed.

Due to the foregoing, it becomes unnecessary to provide the exclusively used air passage and the opening and closing door for opening and closing the air passage which are provided to compose the wind passage for drying the cooler (2). It becomes possible to discharge air, which has passed through the cooler (2) so as to dry it and contains a large quantity of the offensive smell components, outside the vehicle by utilizing the existing equipment. Therefore, the offensive smell of the air-conditioned wind blown out from the air conditioner can be suppressed while an increase in the manufacturing cost of the air conditioner (air conditioner casing) is prevented.

According to a second aspect of the present invention, there is provided an air conditioner for vehicle use comprising: a blower (21) for blowing air into a vehicle compartment; a cooler (2) for cooling the air which has been blown by the blower (21); a heater (3) for heating the air which has been blown by the blower (21); an air conditioning casing (4) for accommodating the cooler (2) and heater (3); and blowout mode doors (9 to 11) arranged in air passages connecting the air conditioning casing (4) with air blowout ports which are open in the vehicle compartment, the blowout mode doors (9 to 11) controlling a state of communication of the air passages; a communicating port (15) for communicating the inside with the outside of the air conditioning casing (4), the communicating port (15) being arranged in the air conditioning casing (4) on the upstream side of the air flow of the air blowout mode doors (9 to 11); and an air blowing control means (S43, S44) for conducting an air blowing mode in which the blower (21) is operated under the condition that the blowout mode doors (9 to 11) are closed.

Due to the foregoing, it becomes unnecessary to provide the exclusively used air passage and the opening and closing door for opening and closing the air passage which are provided to compose the wind passage for drying the cooler (2). It becomes possible to discharge air, which has passed through the cooler (2) so as to dry it and contains a large quantity of the offensive smell components, outside the vehicle by utilizing the existing equipment. Therefore, the offensive smell of the air-conditioned wind blown out from the air conditioner can be suppressed while an increase in the manufacturing cost of the air conditioner (air conditioner casing) is prevented.

According to a third aspect of the present invention, there is provided an air conditioner for vehicle use, further comprising a means for judging whether or not a vehicle is stopped (S1, S21, S31, S41), wherein the air blowing control means (S3, S4, S13, S14, S23, S24, S33, S34, S43, S44) executes the air blowing mode when the means for judging whether or not the vehicle is stopped (S1, S21, S31, S41) judges that the vehicle is stopped.

Due to the foregoing, while the vehicle is stopping, the air blowing mode is previously conducted. Therefore, when a passenger gets into the vehicle, it is possible to prevent the passenger to have an unpleasant feeling caused by the offensive smell.

According to a fourth aspect of the present invention, there is provided an air conditioner for vehicle use, further comprising a means (S2, S12, S42) for executing the air blowing mode when a predetermined period of time has passed after the vehicle was stopped.

According to a fifth aspect of the present invention, there is provided an air conditioner for vehicle use, further comprising an air blowing stop means (S5, S16, S25, S35, S45) for stopping the air blowing mode when a predetermined period of time has passed after the air blowing control means (S3, S4, S13, S14, S23, S24, S33, S34, S43, S44) executed the air blowing mode.

According to a sixth aspect of the present invention, there is provided an air conditioner for vehicle use, further comprising an air blowing stop means (S55, S56) for stopping the air blowing mode when a quantity of water attaching onto a surface of the cooler (2) is decreased to a value not more than a predetermined value after the air blowing control means (S3, S4, S13, S14, S23, S24, S33, S34, S43, S44) executed the air blowing mode.

Due to the foregoing, the air blowing mode can be prevented from being carried out for an unnecessarily long period of time. Therefore, an unnecessary increase in the electric power consumption of the air conditioner for vehicle use can be prevented.

According to a seventh aspect of the present invention, there is provided an air conditioner for vehicle use, further comprising a remote executing means (23) for executing the air blowing mode when a signal is received from a remote operating means.

According to an eighth aspect of the present invention, there is provided an air conditioner for vehicle use, further comprising an automatic ventilation means for automatically ventilating a vehicle compartment when a stoppage of the vehicle is judged by a means (S1, S21, S31, S41) for judging whether or not the vehicle is stopped.

According to a ninth aspect of the present invention, there is provided an air conditioner for vehicle use, further comprising a means (S34) for generating a refrigerating capacity in the cooler (2) while the air blowing mode is being executed.

Due to the foregoing, the offensive smell components can be previously discharged outside the vehicle, and it becomes possible to get a surface of the cooler (2) wet so that the offensive smell cannot be generated. Accordingly, when a passenger gets into the vehicle, an unpleasant feeling cannot be given to the passenger.

According to a tenth aspect of the present invention, there is provided an air conditioner for vehicle use, further comprising a means (S73 to S75, S83 to S85) for executing the air blowing mode when a quantity of water attaching onto the surface of the cooler (2) is decreased to a value not more than a predetermined value.

Due to the foregoing, the air blowing mode can be prevented from being carried out for an unnecessarily long period of time. Therefore, an unnecessary increase in the electric power consumption of the air conditioner for vehicle can be prevented.

Incidentally, the reference numerals in parentheses, to denote the above means, are intended to show the relationship of the specific means which will be described later in an embodiment of the invention.

The present invention may be more fully understood from the description of preferred embodiments of the invention set forth below, together with the accompanying drawings.

DESCRIPTION OF PREFERRED EMBODIMENTS

Figure 1:
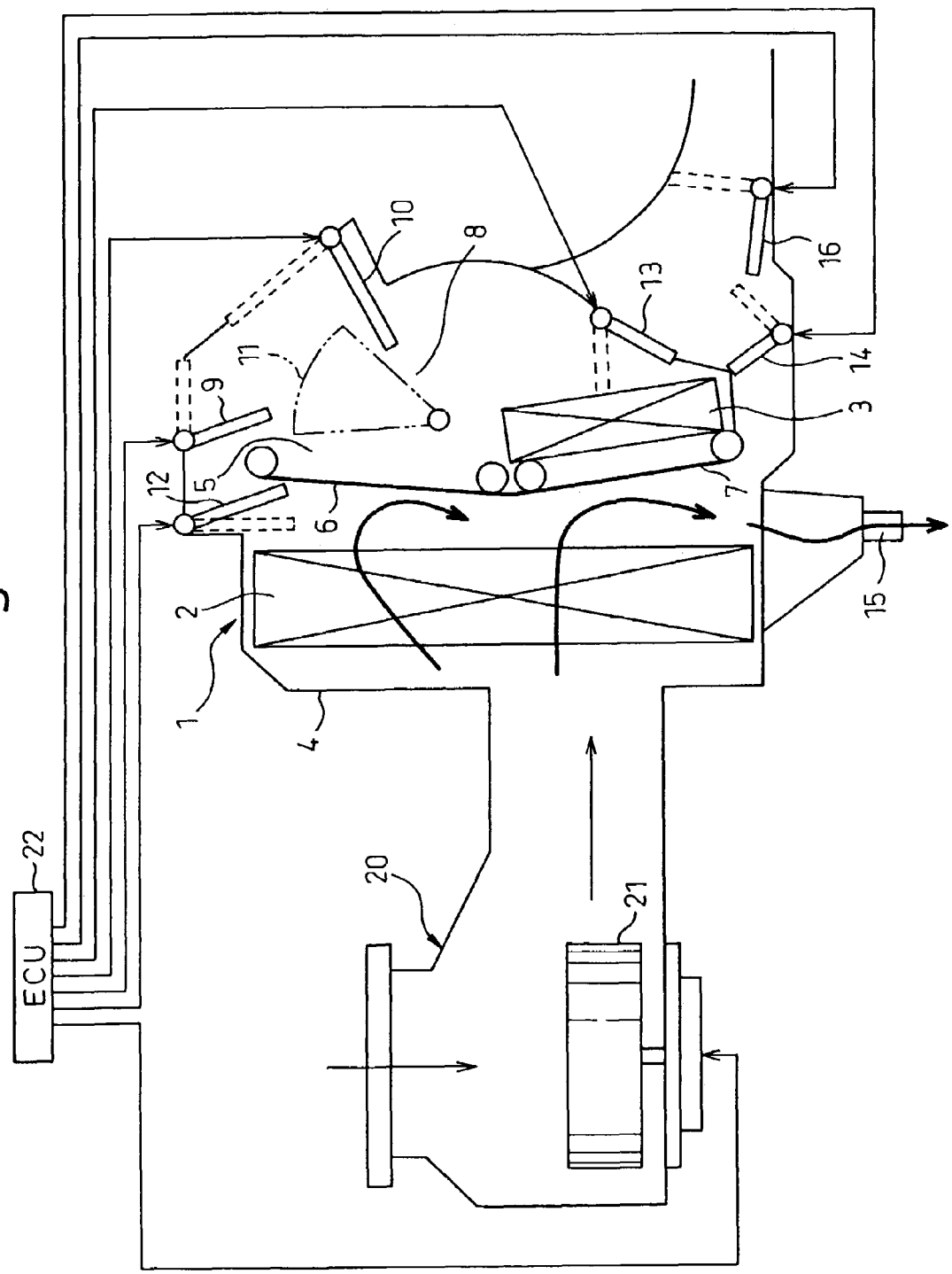
FIG. 1 is a view showing a model of the air conditioner for vehicle use of the first embodiment of the present invention.

First, an air conditioner for vehicle use of the first embodiment of the present invention will be explained below. FIG. 1 is a view showing a model of the air conditioner for vehicle use of the embodiment of the present invention. This air conditioner for vehicle use includes an air conditioner unit 1 and an air blowing unit 20.

Figure 2:
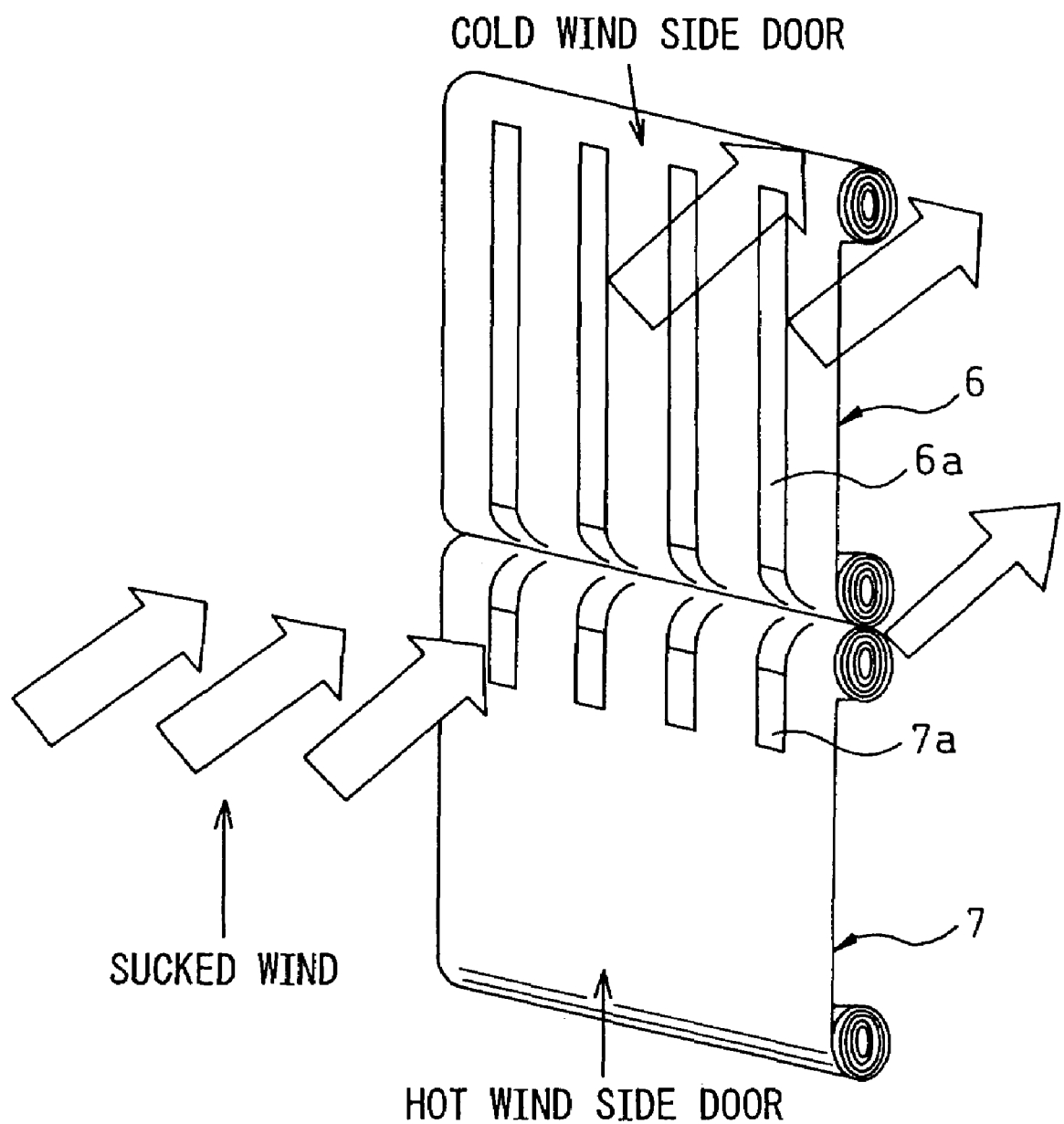
FIG. 2 is a perspective view showing an air mixing door of the first embodiment of the present invention.
Figure 3:
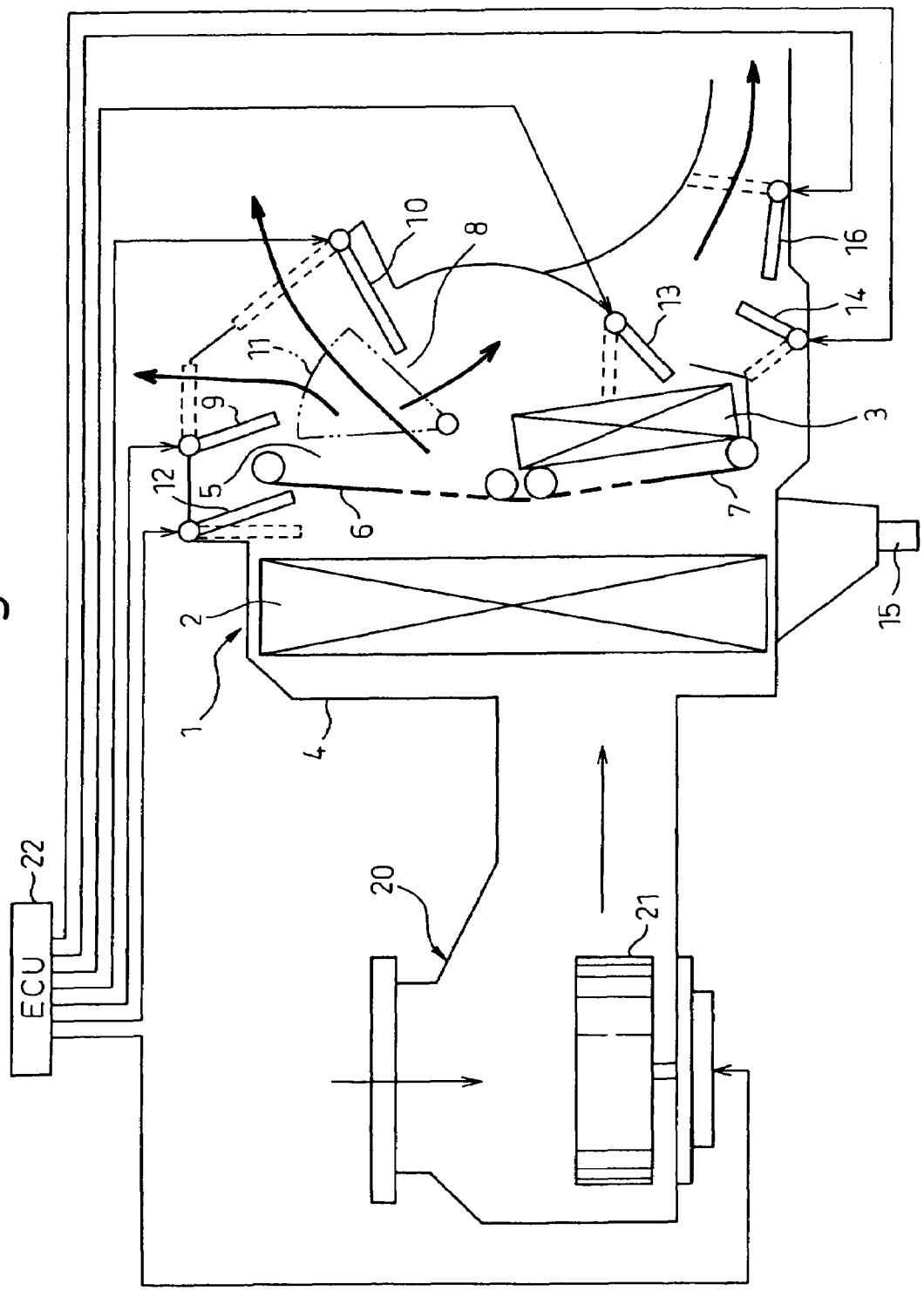
FIG. 3 is a schematic illustration for explaining operation of the air conditioner for vehicle use of the first embodiment of the present invention.
Figure 4:
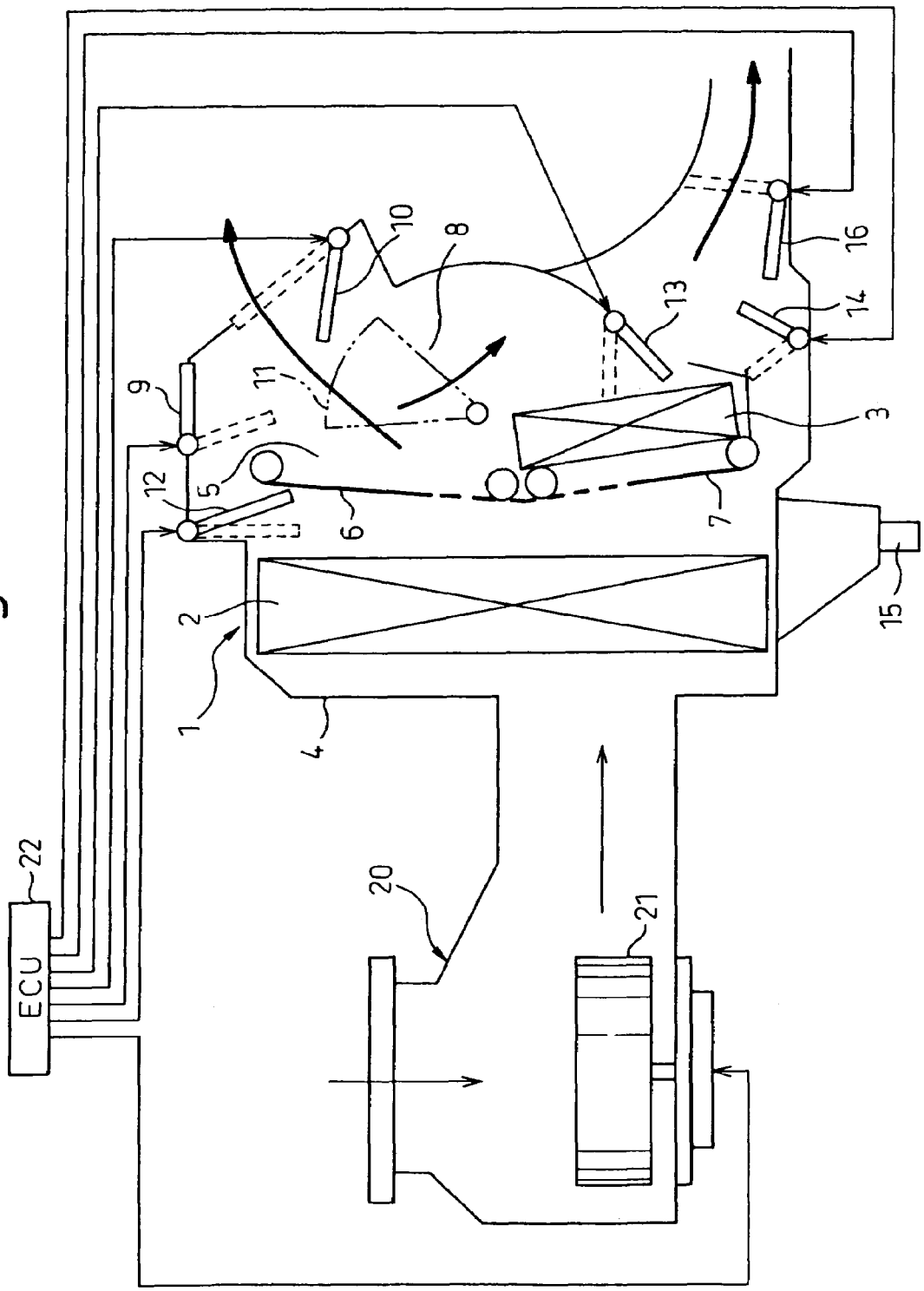
FIG. 4 is a schematic illustration for explaining operation of the air conditioner for vehicle use of the first embodiment of the present invention.
Figure 5:
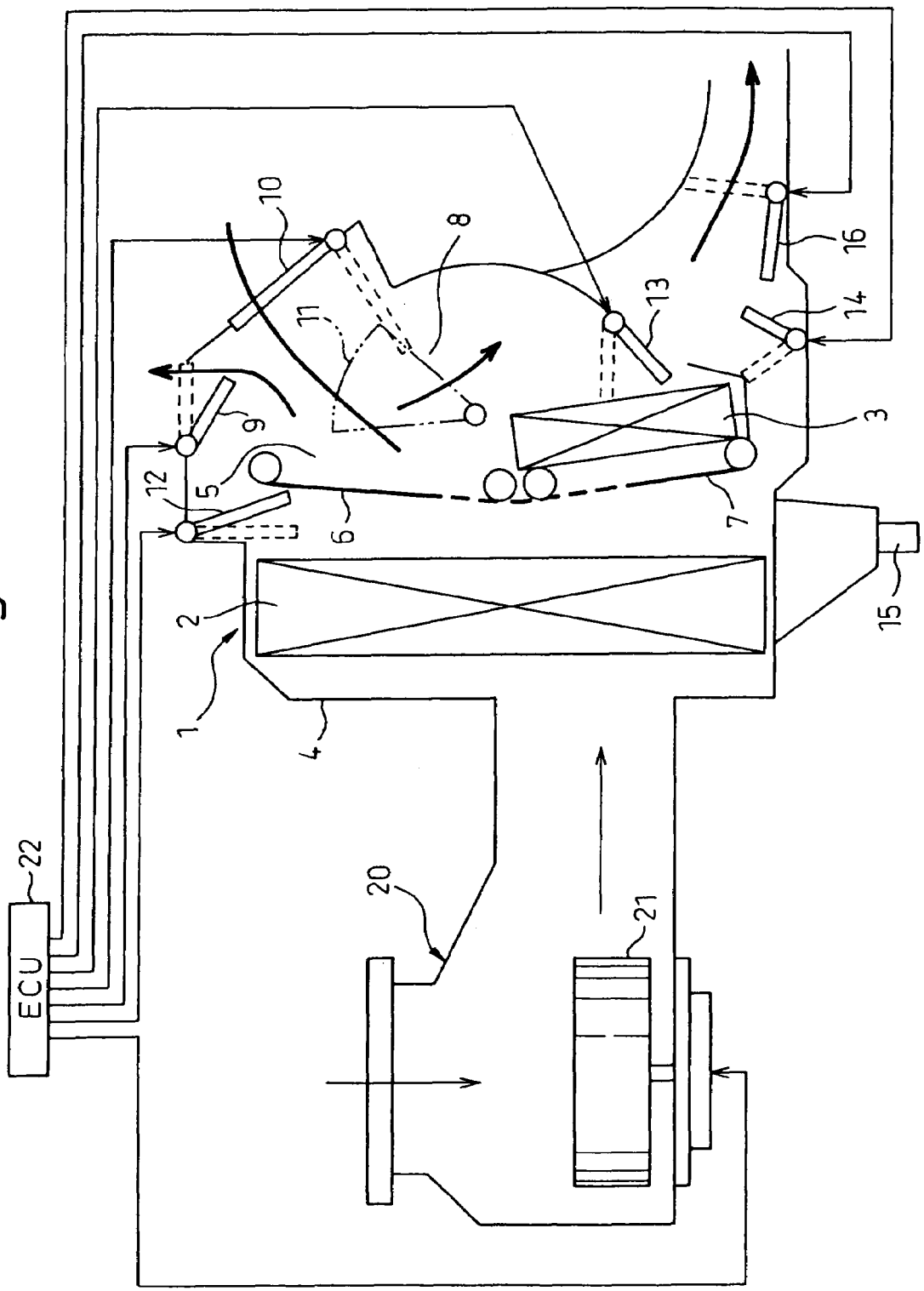
FIG. 5 is a schematic illustration for explaining operation of the air conditioner for vehicle use of the first embodiment of the present invention.
Figure 6:
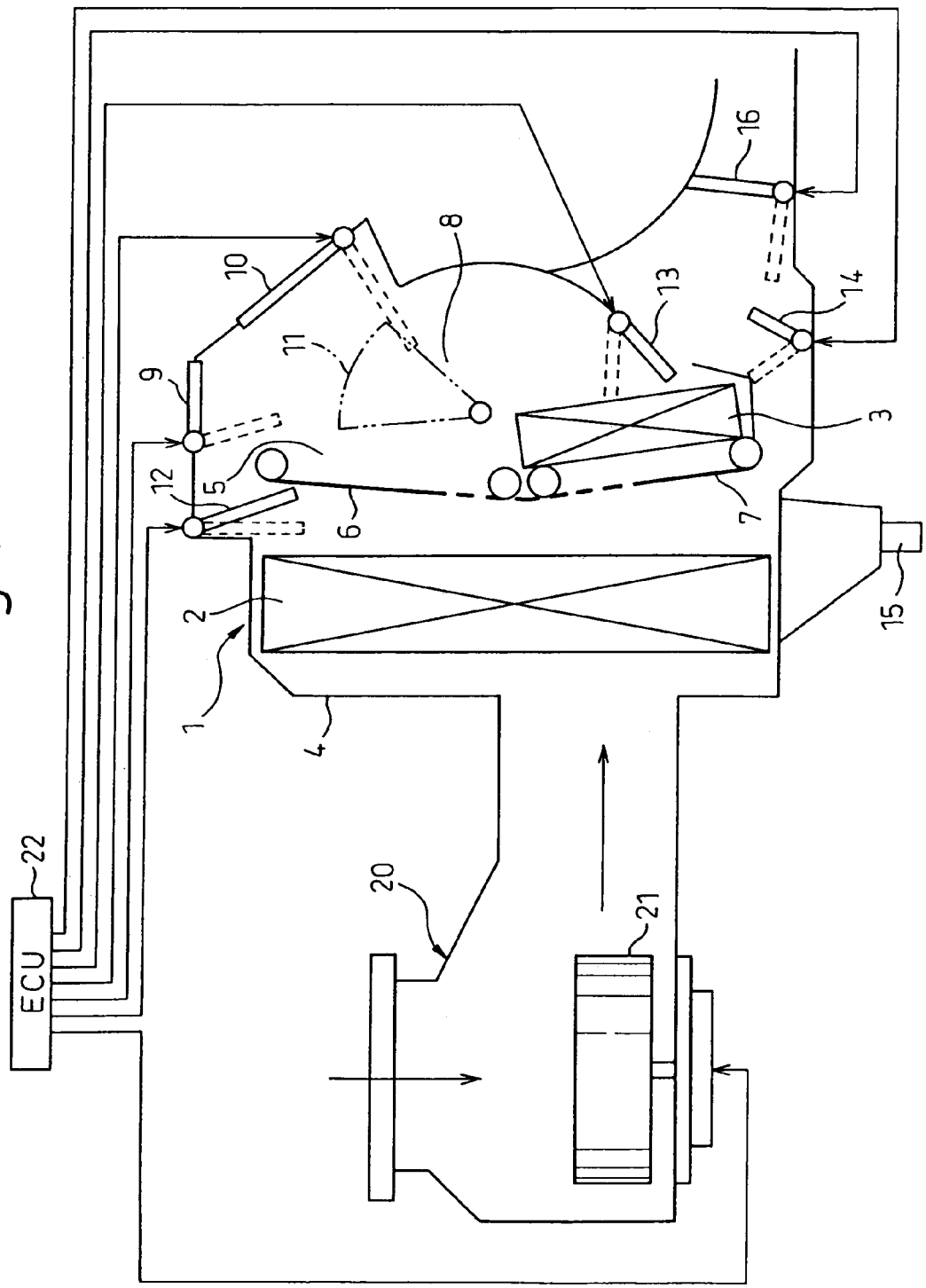
FIG. 6 is a schematic illustration for explaining operation of the air conditioner for vehicle use of the first embodiment of the present invention.

In this connection, FIG. 2 is a schematic illustration for explaining an air mixing door. FIGS. 3 to 9 are views showing a model of the air current in the air conditioner for vehicle use of this embodiment.

In FIG. 1, the air blowing unit 20 includes: a blower 21 for blowing air to the air conditioning unit 1; and an inside and outside cooling air changeover device (not shown) for adjusting quantities of inside and outside air supplied to the blower 21.

The air conditioning unit 1 is composed of an air conditioning casing 4 in which the cooler 2 and the heater 3 are accommodated, and the air passages are composed. In this structure, the cooler 2 is a heat exchanger for cooling air which has been blown by the air blowing unit 20. The heater 3 is a heat exchanger for heating air which has been blown by the air blowing unit 20.

In this connection, the cooler 2 is an evaporator arranged in a well known vapor-compression type refrigerating machine provided with a compressor driven by an engine used for running. The heater 3 is a heat exchanger, the heat source of which is waste heat in the engine coolant of a vehicle.

The heater 3 is arranged on the downstream side of the air flow of the cooler 2. On an upper side of the heater 3, the bypass passage 5 is provided, in which air passing through the cooler 2 is made to flow to the downstream side while making a detour of the heater 3.

The cool wind side air mixing door 6 adjusts a state of communication of the heater bypass passage 5, that is, the cool wind side air mixing door 6 adjusts a quantity of cool wind flowing into the air mixing chamber 8 passing through the heater bypass passage 5. The hot wind side air mixing door 7 adjusts a quantity of hot wind flowing into the air mixing chamber 8 passing through the heater 3. In this way, temperature of the wind which blows into the passenger compartment can be adjusted.

In this connection, both of the air mixing doors 6 and 7 are well known film-type doors composed in such a manner that the holes 6a, 7a, in which air flows, are formed on a thin film as shown in FIG. 2, and an area of the hole, in which air flows, can be changed when this film is moved by being wound.

As shown in FIG. 1, the air mixing chamber 8 includes: a defroster door 9 for opening and closing a defroster opening portion communicating with the defroster blowout port from which air is blown out toward a window-pane; a face door 10 for opening and closing a face opening portion communicating with the face blowout port from which air is blown out upward in the passenger compartment; and a foot door 11 for opening and closing a foot opening portion communicating with the foot blowout port from which air is blown out downward in the passenger compartment. In this way, various air blowing mode doors are provided in the air mixing chamber 8.

In this connection, in the blowing mode doors 9, 10 of this embodiment, the degree of the opening portion is adjusted when a plate-shaped door body is oscillated. In the foot door 11, the degree of the foot opening portion is adjusted when a plate-shaped or fan-shaped door body is oscillated.

The cold wind door 12 is a door means for opening and closing a cold wind passage for introducing a cold wind, which has passed through the cooler 2 in the case of a bilevel blowing mode, in which air is blown out from both the face blowout port and the foot blowout port, while the air detours around the air mixing chamber 8. The rear hot wind side air mixing door 13 is a door means for adjusting a quantity of the hot wind supplied to the blowout port for the rear seat. The rear cold wind side air mixing door 14 is a door means for adjusting a quantity of the cold wind supplied to the rear seat blowout port. The rear door 16 is a door means for opening and closing an opening portion on the air conditioning casing 4 side connected to the blowout port for the rear seat.

On the lower side of the cooler 2 of the air conditioning casing 4, that is, in the lower portion on the upstream side of the air flow of the entrance portion of the heater 3 and the heater bypass passage 5, the discharge port 15 is arranged, from which water containing the condensed water generated in the cooler 2 is discharged when the inside and the outside of the air conditioning casing 4 are communicated with each other by the discharge port 15. In this connection, in this embodiment, the discharge port 15 is the communicating port described in the claim of the present invention.

In this connection, in this embodiment, when a relatively long hose is connected to the discharge port 15, a big pressure loss is caused in the discharge port 15, so that an air conditioning wind flowing in the air conditioning casing 4 can be prevented from leaking outside the air conditioning casing 4 from the discharge port 15. However, it should be noted that the invention is not limited to the above specific structure. For example, an air conditioning wind may be prevented from leaking outside the air conditioning casing 4 from the discharge port 15 by reducing the degree of the opening of the discharge port 15.

In this connection, concerning the blowing mode of air in which air is blown out into the passenger compartment, the air conditioner for vehicle use of this embodiment includes: a multiple mode (shown in FIG. 3) in which the air conditioning wind is blown out from all the blowout ports; a face mode in which the air conditioning wind is blown out from the face blowout port; a bilevel mode (shown in FIG. 4) in which the air conditioning wind is blown out from both the face blowout port and the foot blowout port; a foot mode in which the air conditioning wind is mainly blown out from the foot blowout port; a foot and defroster mode (shown in FIG. 5) in which the air conditioning wind is blown out from the foot blowout port and the defroster blowout port; a defroster mode in which the air conditioning wind is mainly blown out from the defroster blowout port; and a totally closed mode (shown in FIG. 6) in which all the opening portions (the blowout mode doors 9 to 11) are closed.

Figure 7:
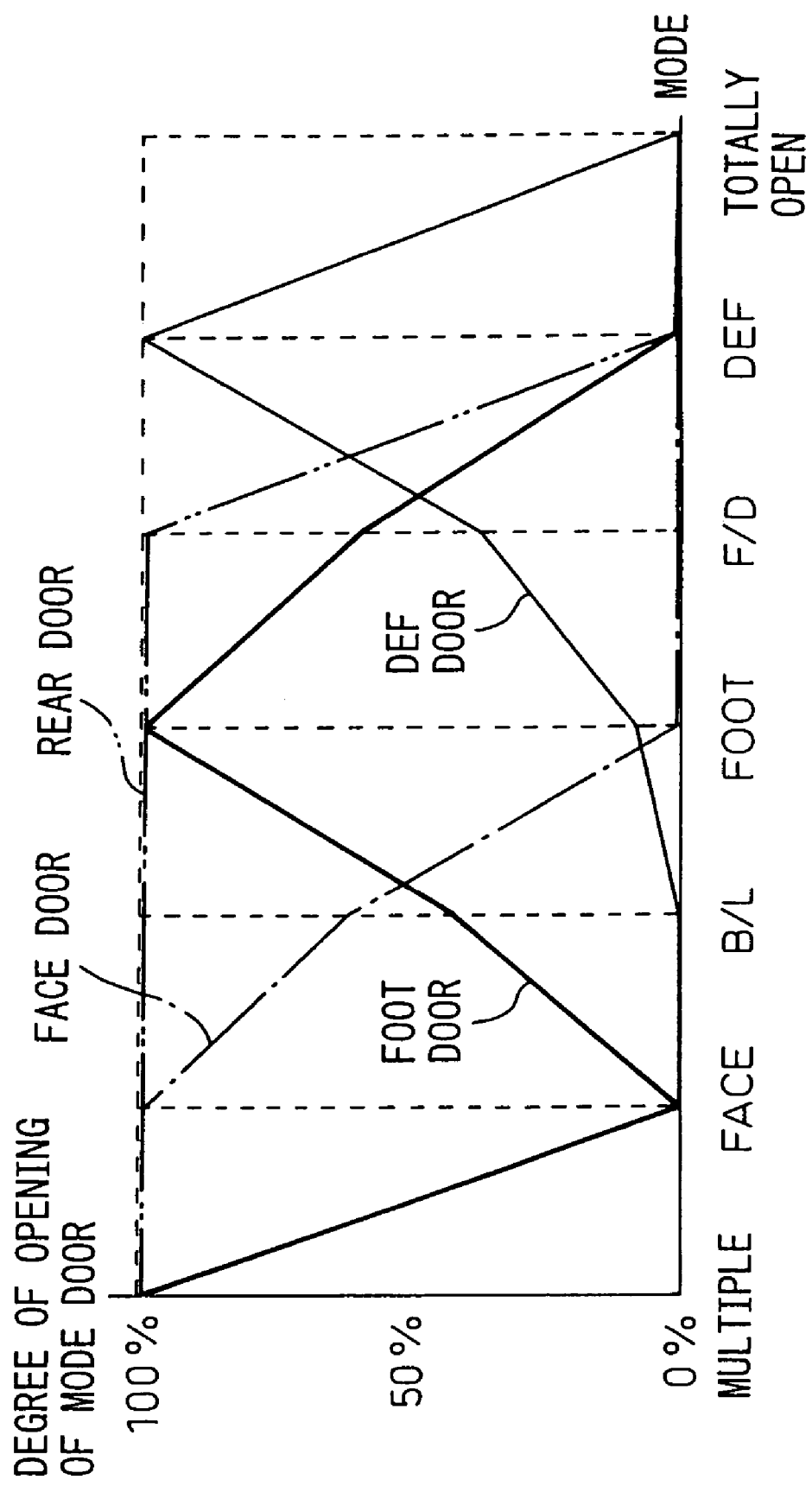
FIG. 7 is a diagram of the operation pattern showing each air blowing mode and the degree of opening of the blowing mode doors 9 to 11.

In this connection, FIG. 7 is a typical diagram of operation showing a relation between the blowout mode (including the totally closed mode) and the degree of the opening of the blowout mode doors 9 to 11.

In this connection, the above diagram showing the blowout mode and the operation pattern is made on the assumption that the blowout mode doors 9, 10 are operated by a servo motor. For example, when the servo motor is set at the door of each blowout mode, operation is not limited to the above diagram of the blowout mode and the operation pattern.

In the air conditioner for vehicle use of this embodiment, according to the detection values of air conditioning control sensors (not shown) such as a compartment temperature sensor, an outside air temperature sensor and a sunshine sensor and also according to the target blowout temperature TAO calculated according to the desired compartment temperature which has been inputted by a passenger when the passenger manually operates an air conditioning control panel (not shown), a quantity of the blowing air, that is, a voltage impressed upon the electric motor to drive the blower 21, the degrees of the openings of the air mixing doors 6, 7, 13, 14, and the degrees of the openings of the blowout mode doors 9 to 11, that is, the blowout mode are determined by the electronic control unit (ECU) 22, and these are automatically controlled by the electronic control unit 22.

Figure 8:
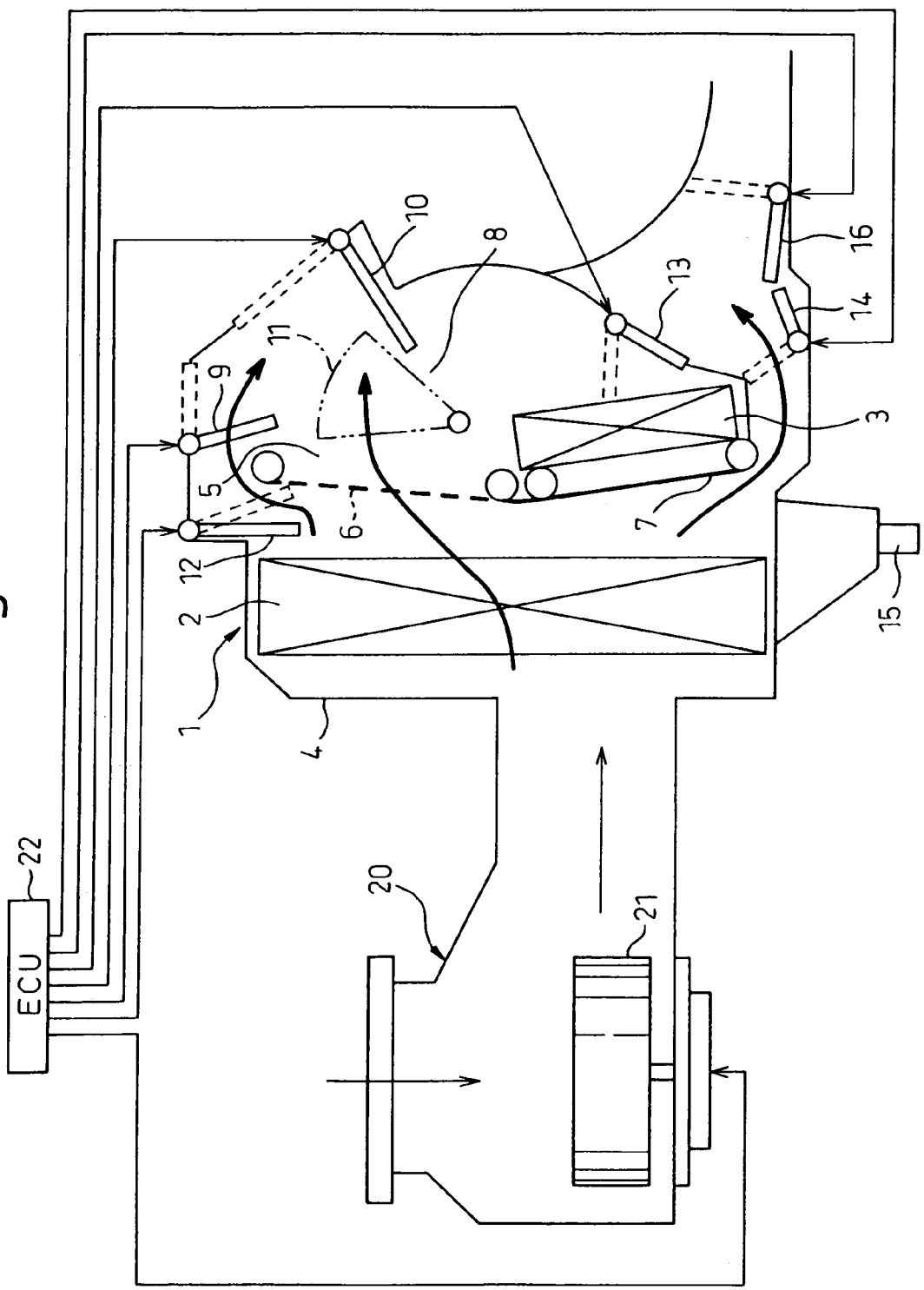
FIG. 8 is a schematic illustration for explaining operation of the air conditioner for vehicle use of the first embodiment of the present invention.
Figure 9:
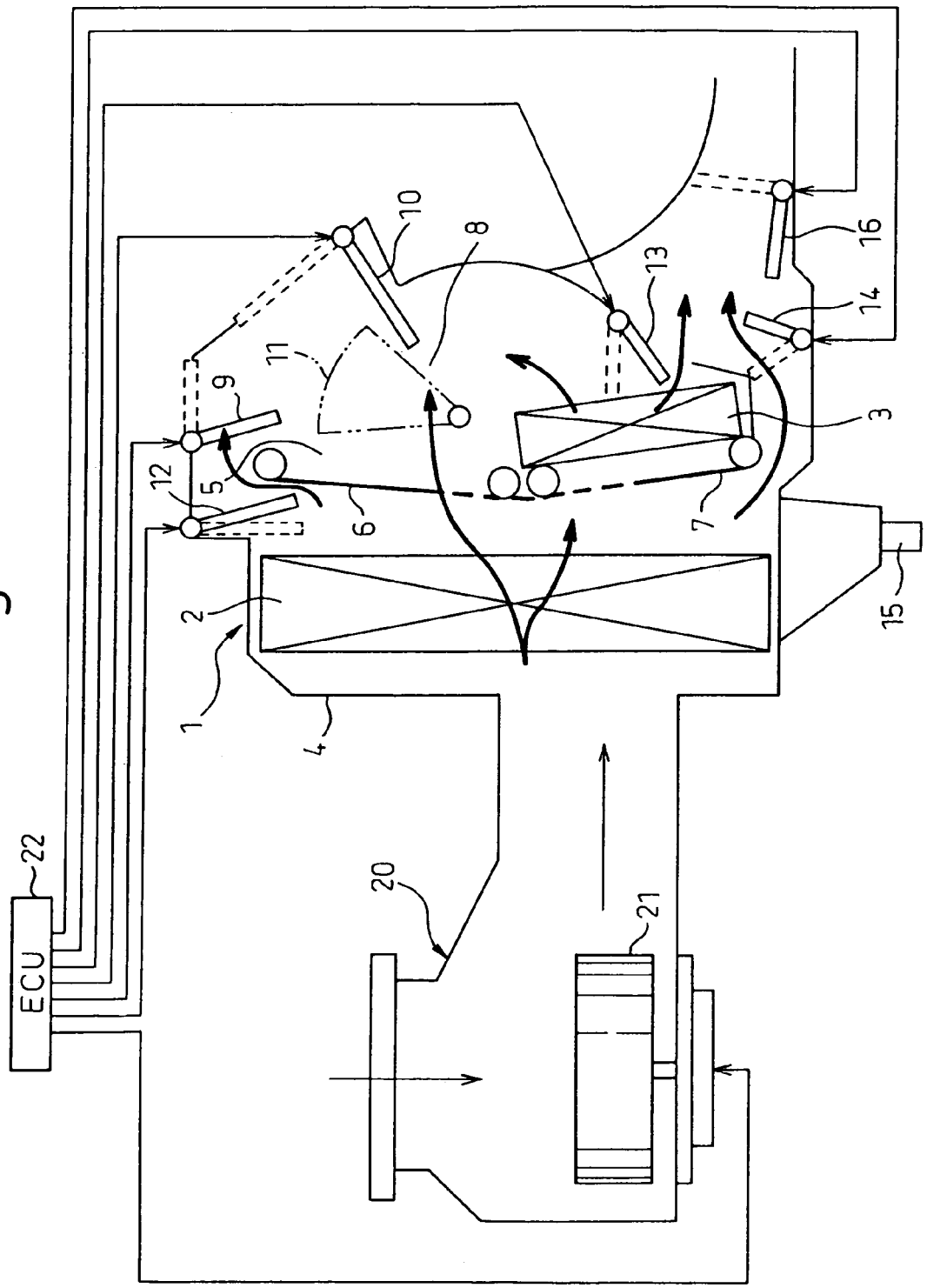
FIG. 9 is a schematic illustration for explaining operation of the air conditioner for vehicle use of the first embodiment of the present invention.
Figure 10:
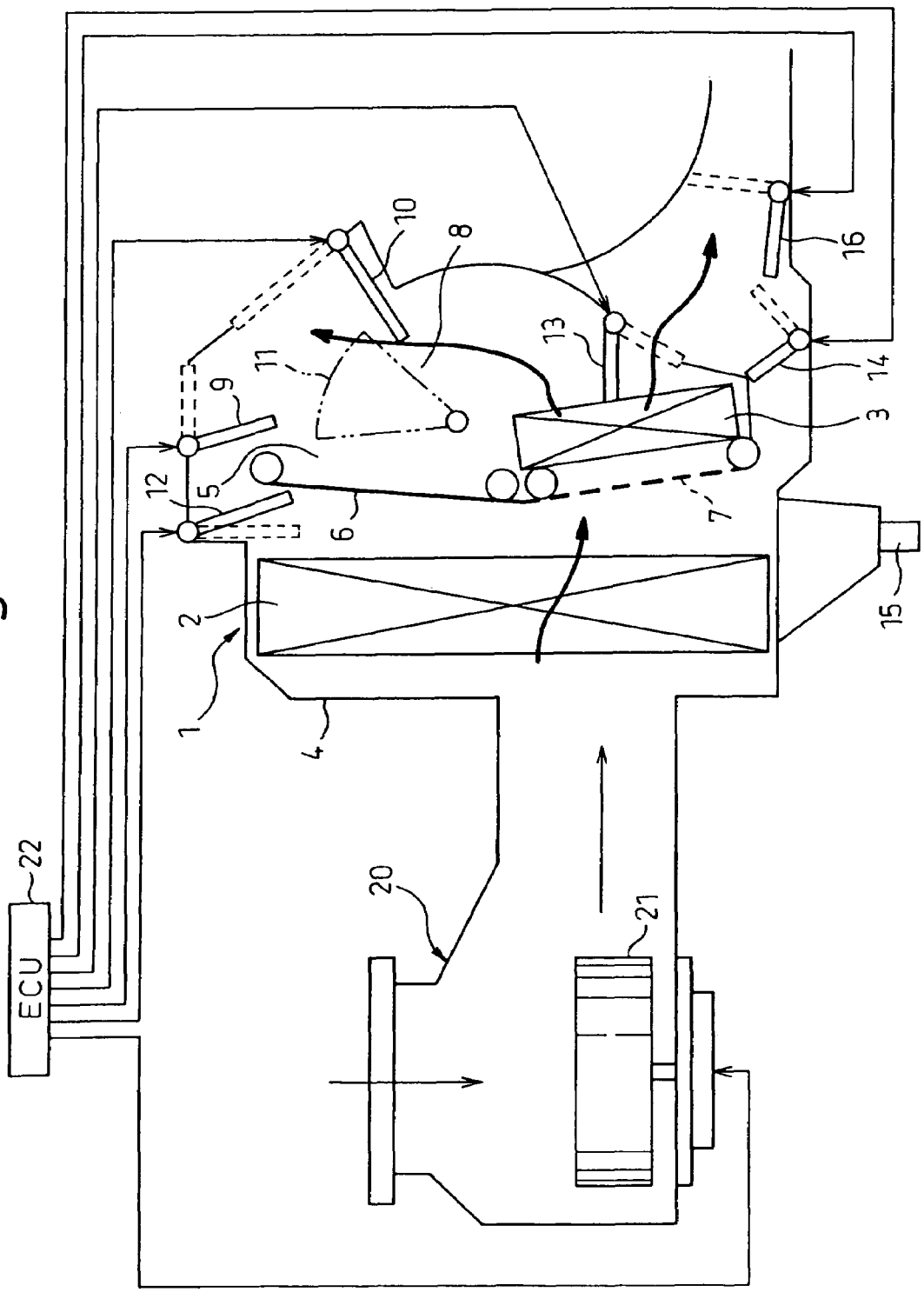
FIG. 10 is a schematic illustration for explaining operation of the air conditioner for vehicle use of the first embodiment of the present invention.

Therefore, as shown in FIGS. 8 to 10, according to the target blowout temperature TAO, the degrees of the openings of both the air mixing doors 6, 7 and the degrees of the openings of the blowout mode doors 9 to 11 are changed while being linked to each other.

Figure 11:
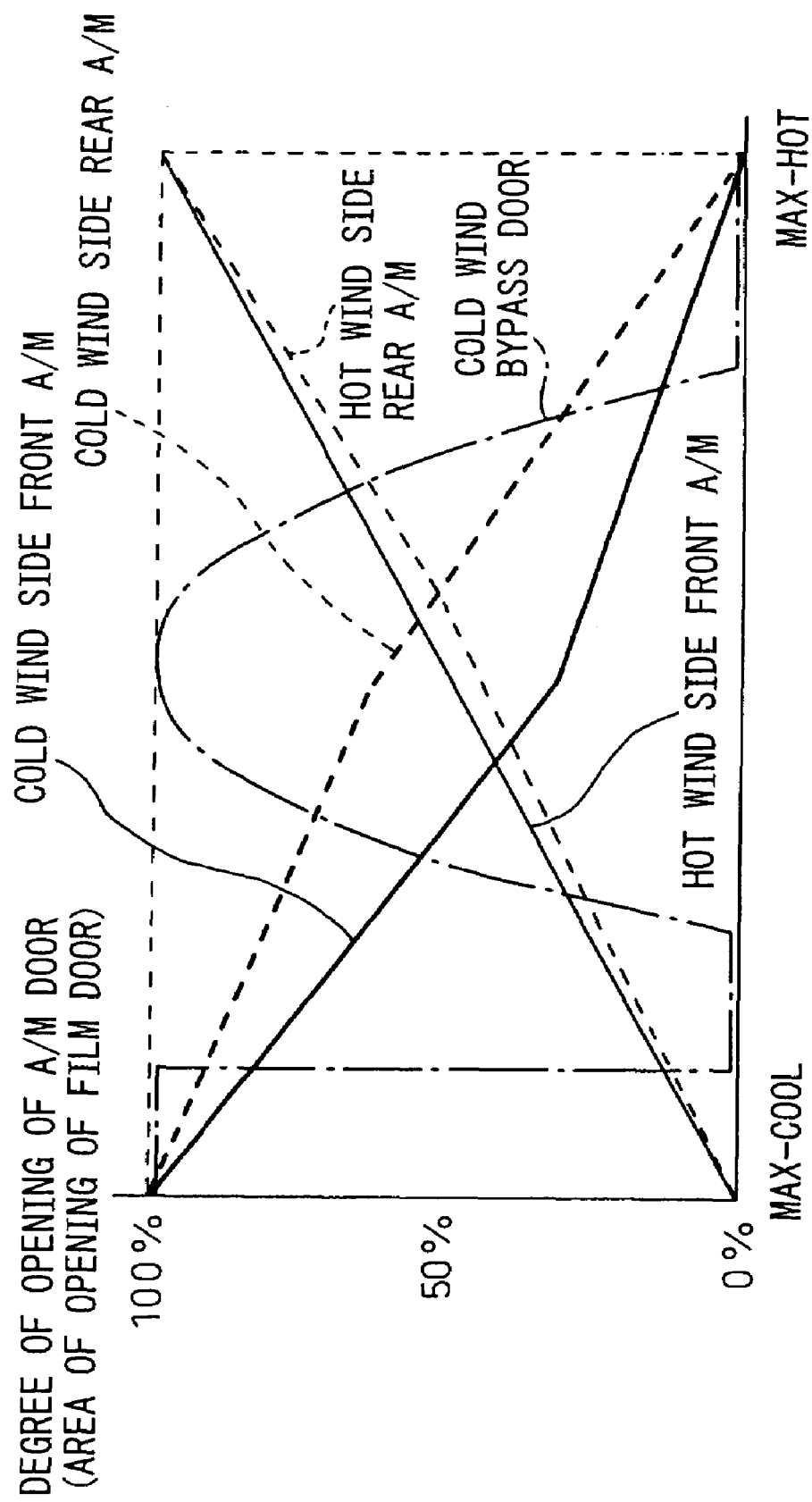
FIG. 11 is a diagram of the operation pattern showing the degree of opening of the air mixing doors 6, 7, 13 and 14.

In this connection, in FIGS. 8 to 10, MAXCOOL denotes that the target blowout temperature TAO is decreased and a quantity of the hot wind becomes 0, and MAXHOT denotes that the target blowout temperature TAO is increased and a quantity of the cold wind becomes 0. FIG. 11 is a typical operation pattern diagram showing the degrees of the openings of the air mixing doors 6, 7, 13, 14.

Next, the operation of the air conditioner for vehicle use of this embodiment will be explained below.

In the air conditioner for vehicle use of this embodiment, when it is assumed that the engine is stopped and a predetermined period of time has passed so that the vehicle has stopped or the vehicle has been parked, the cool wind side air mixing door 6, the hot wind side air mixing door 7, the cool wind door 12 and the cool wind side air mixing door 14 are totally closed and the blower 21 is operated for a predetermined period of time.

Figure 12:
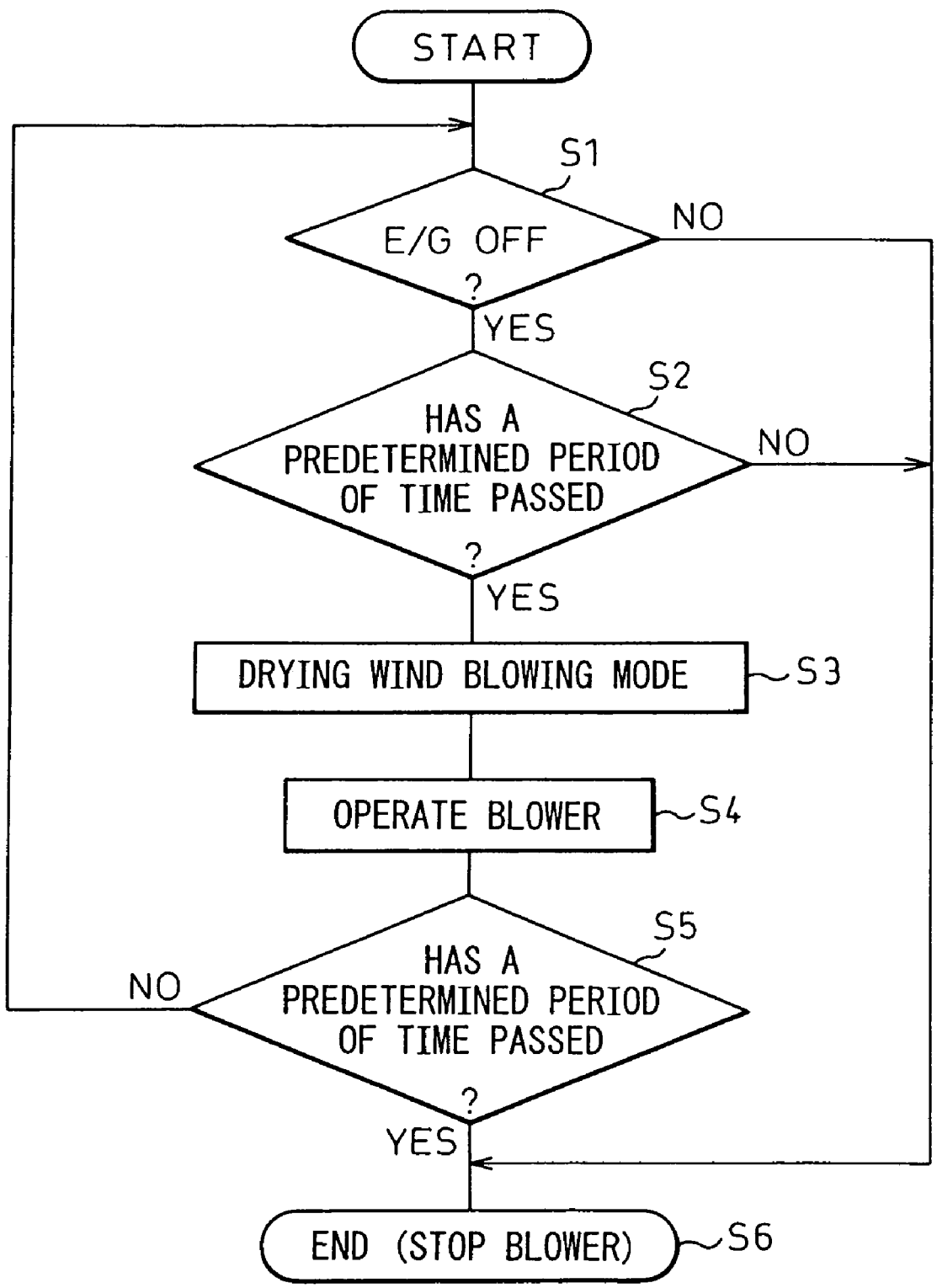
FIG. 12 is a flow chart showing operation of the air conditioner for vehicle use of the first embodiment of the present invention.

FIG. 12 is a flow chart showing an example of operation control of the above air conditioner for vehicle use. While electric power is being supplied from a battery (not shown), this flow chart is executed at all times.

According to whether the ignition switch, which is a starting switch of a vehicle, is turned on or off, that is, according to whether the voltage generated in the ignition switch exceeds a predetermined value or not, it is judged whether the engine is stopped or not (S1). In the case of stoppage of the engine, it is judged whether or not a predetermined period of time has passed from the time when the engine stopped (S2).

In this connection, in the case where the engine is operated, the control shown in FIG. 12 is stopped.

In the case where a predetermined period of time has passed from the time when the engine stopped, the cold wind side air mixing door 6, the hot wind side air mixing door 7, the cold wind door 12 and the rear cold wind side air mixing door 14 are totally closed so that the operation mode is set at the dry air blowing mode (S3) and the blower 21 is operated (S4).

It is judged whether or not this state has continued for a predetermined period of time (S5). When this state has continued for the predetermined period of time, the blower 21 is stopped (S6). When this state has not continued for the predetermined period of time, the program is returned to S1.

In this connection, the predetermined period of time in S5 is a period of time which is necessary for a quantity of water of the cooler 2 to be decreased to a value not more than a predetermined quantity. This predetermined period of time can be found by experiment.

When the drying air blowing mode is carried out, either the inside air circulating mode, in which air in the compartment is sucked and blown out, or the outside air introducing mode, in which the outside air is sucked and blown out, may be adopted. However, it is preferable that air of a low relative humidity such as the outside air is sucked and blown out.

Next, the operation and effect of the air conditioner for vehicle use of the present embodiment will be described below.

In the air conditioner for vehicle use of this embodiment, when it is assumed that the engine is stopped and a predetermined period of time has passed so that the vehicle has stopped or the vehicle has been parked, the cool wind side air mixing door 6, the hot wind side air mixing door 7, the cool wind door 12 and the cool wind side air mixing door 14 are totally closed and the blower 21 is operated for a predetermined period of time. Therefore, drying air, which has passed through the cooler 2 so as to dry the cooler 2 and contains a large quantity of the offensive smell components, cannot flow anywhere. Therefore, the drying air is discharged outside the air conditioning casing 4 from the discharge port 15.

Accordingly, it becomes unnecessary to provide an exclusively used air passage and an opening and closing door for opening and closing the air passage which are provided to composed the wind passage for drying the cooler 2. It becomes possible to discharge air, which has passed through the cooler 2, so as to dry it, and contains a large quantity of the offensive smell components, outside the vehicle by utilizing the existing equipment. Therefore, an offensive smell of the air-conditioned air blown out from the air conditioner can be suppressed while an increase in the manufacturing cost of the air conditioner (air conditioner casing) is being prevented.

In this connection, in this embodiment, it is possible to consider the following means. At the same time when air is blown to the cooler 2 so as to dry the cooler 2, the drying air is discharged outside the passenger compartment, that is, the drying air blowing mode is conducted for a predetermined period of time when the air conditioner for vehicle use is started. However, according to this means, it is impossible to conduct air conditioning in the passenger compartment at the same time when the air conditioner for vehicle use is started.

On the other hand, according to this embodiment, when the vehicle is stopped or parked, the drying air blowing mode is previously conducted. Therefore, it is possible to conduct air conditioning in the passenger compartment simultaneously when the air conditioner for vehicle use is started.

Next, the second embodiment will be explained below. This embodiment is applied to a vehicle having an automatic ventilating device or an automatic ventilating function in which sensors (not shown) for detecting parameters, which increase according to an increase in the compartment temperature, such as a detection value of the compartment temperature sensor, a detection value of the sunshine sensor and a detection value of the infrared ray sensor, are arranged and when the detection values of these sensors exceed a predetermined value, the passenger compartment is automatically ventilated.

In this connection, the automatic ventilating device or the automatic ventilating function of the present embodiment is an automatic ventilating means for conducting ventilation in the passenger compartment by automatically operating the air blowing unit 20, that is, by automatically operating the blower 21 in the outside air introducing mode when the detection values of the above sensors exceed a predetermined value. In this embodiment, when the air conditioner for vehicle use is given an automatic ventilating function, the air conditioner for vehicle use itself is made to be the automatic ventilating device. Of course, another automatic ventilating device exclusively used for ventilation may be provided.

In this connection, the blowout mode in the case of conducting automatic ventilation may be either the face mode, the bilevel mode, the foot mode or the defroster mode. In this embodiment, the automatic ventilation is conducted in the face mode.

Figure 13:
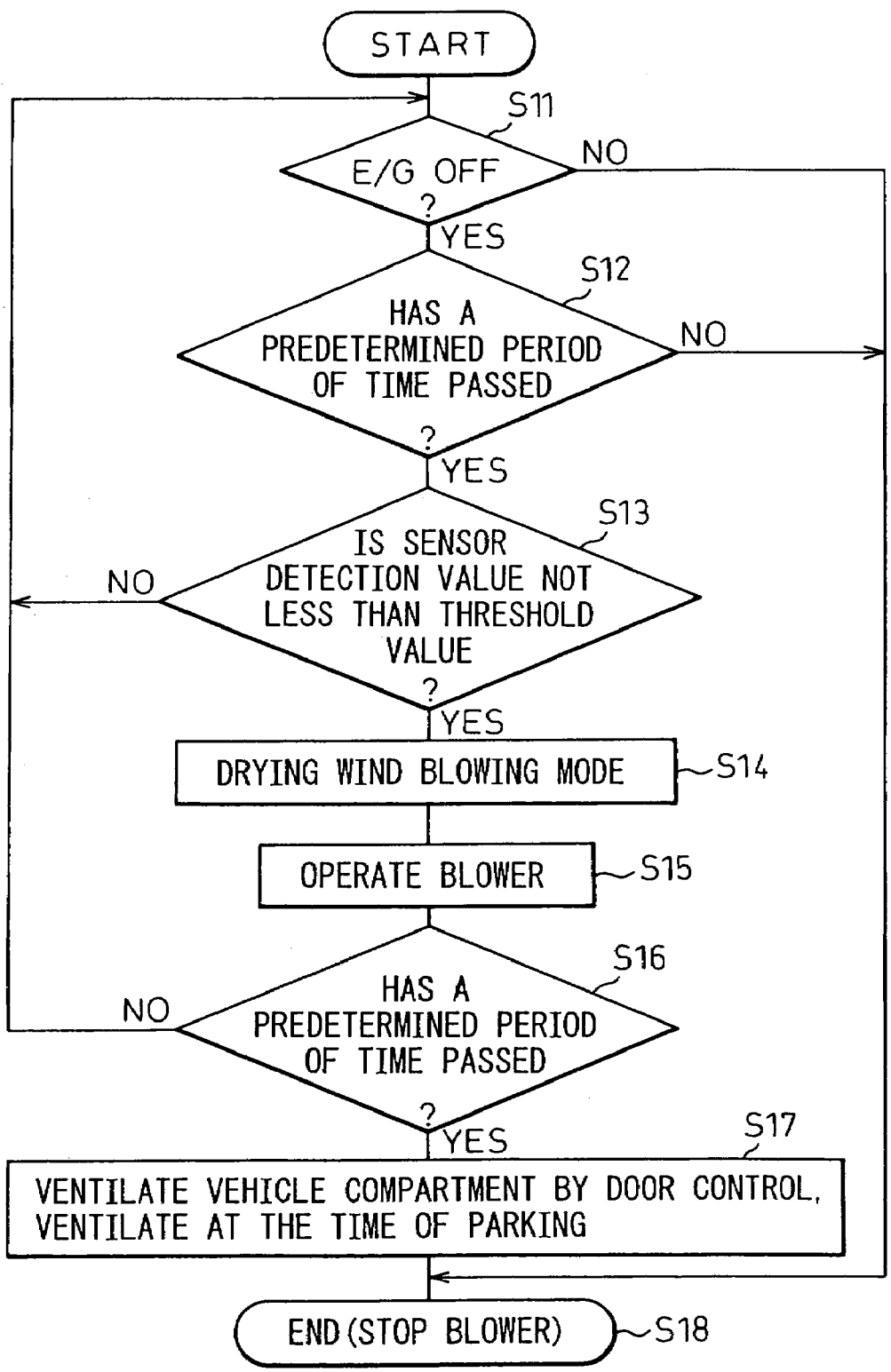
FIG. 13 is a flow chart showing operation of the air conditioner for vehicle use of the second embodiment of the present invention.

FIG. 13 is a flow chart showing an example of controlling the air conditioner for vehicle use of this embodiment. This flow chart is executed at all times while electric power is being supplied from the battery.

According to whether the ignition switch is turned on or off, it is judged whether or not the engine is stopped (S11). In the case where the engine is stopped, it is judged whether or not a predetermined period of time has passed from the time of stoppage of the engine (S12). In this connection, when the engine is being operated, the control shown in FIG. 13 is stopped.

Next, it is judged whether or not a detection value of the sensor (the compartment temperature sensor not shown in this embodiment) for detecting a parameter, which rises according to a rise of the compartment air temperature, is not less than a predetermined threshold value (S13).

In the case where the detection value of the sensor is not less than the threshold value, the cold wind side air mixing door 6, the hot wind side air mixing door 7, the cold wind door 12 and the rear cold wind side air mixing door 14 are totally closed so that the mode is set at the drying air blowing mode (S14), and the blower 21 is set in motion at the same time (S15). In this connection, when the detection value of the sensor is lower than the threshold value, the program is returned to S11.

It is judged whether or not a predetermined period of time has passed in this state (S16). In the case where the predetermined period of time has passed in this state, the automatic ventilation device is operated for a predetermined period of time as described above (S17), and then the automatic ventilating device, that is, the blower 21 is stopped (S18). In the case where the predetermined period of time has not passed in this state, the program is returned to S11.

Due to the foregoing, when the vehicle is stopped or parked, the drying air blowing mode is previously conducted. Therefore, the offensive smell components can be previously discharged outside the vehicle, and it is possible to conduct air conditioning in the passenger compartment simultaneously when the air conditioner for vehicle use is started.

In this connection, in this embodiment, the drying air blowout mode is executed immediately before the start of the automatic ventilating device. However, the drying air blowout mode may be executed simultaneously with the start of the automatic ventilating device or after the start of the automatic ventilating device.

In the case where the engine is stopped and a predetermined period of time has passed, the automatic ventilating device may be operated at a predetermined time by a timer and the drying air blowout mode may be executed before the start of the automatic ventilating device, being linked with the operation of the automatic ventilating device.

Next, the third embodiment will be explained below. In the first embodiment, the drying air blowout mode is executed when the engine is stopped and a predetermined period of time has passed. However, in this embodiment, the drying air blowout mode is automatically executed at a predetermined time when the engine is stopped.

Specifically, operation is conducted as follows. A user sets a timer of the input device such as an operation panel connected to the electronic control unit 22 so as to set the time when the drying air blowout mode is automatically executed, and the drying air blowout mode is executed at the time which was set on the timer by the user and when the engine is stopped.

Figure 14:
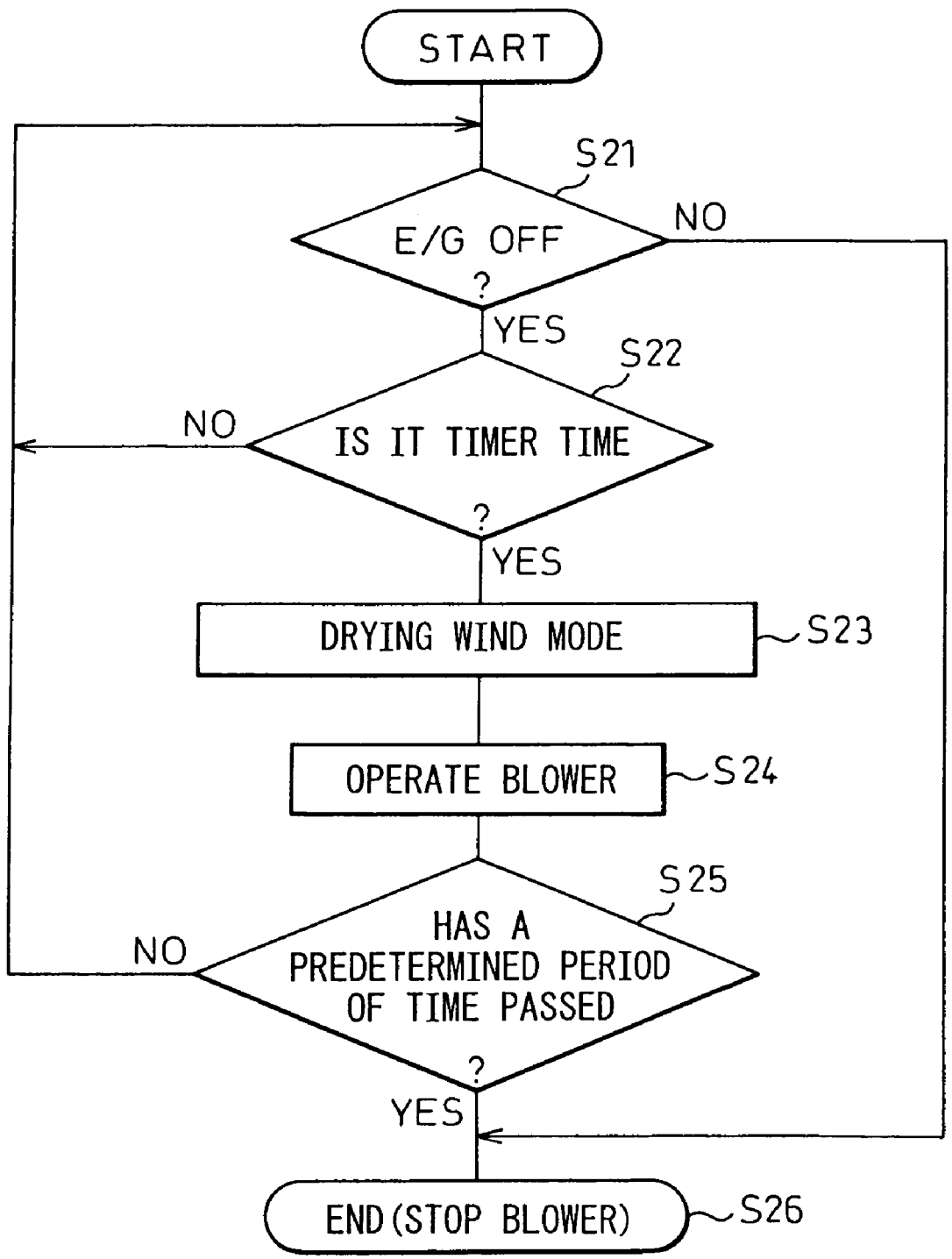
FIG. 14 is a flow chart showing operation of the air conditioner for vehicle use of the third embodiment of the present invention.

FIG. 14 is a flow chart showing an example of controlling the air conditioner for vehicle use of this embodiment. This flow chart is executed at all times while electric power is being supplied from the battery.

Whether the ignition switch is turned on or off, it is judged whether or not the engine is stopped (S21). In the case where the engine is stopped, it is judged whether or not it is the predetermined time which was set by the user on the timer (S22). In the case where the engine is operated, control shown in FIG. 14 is stopped.

In this embodiment, the electronic control unit 22 recognizes the present time by the clock provided in the electronic control unit 22. The time of this internal clock and the time which was set by the user are compared with each other at every predetermined time, so that it is judged whether it is the predetermined time or not.

When the present time is the same as the time which was set by the user on the timer, or when the present time exceeds the time which was set by the user on the timer, the cold wind side air mixing door 6, the hot wind side air mixing door 7, the cold wind door 12 and the rear cold wind side air mixing door 14 are totally closed so that the mode is set at the drying air blowout mode (S23), and the blower 21 is set in motion at the same time (S24).

It is judged whether or not a predetermined period of time has passed in this state (S25). In the case where the predetermined period of time has passed in this state, the blower 21 is stopped (S26). In the case where the predetermined period of time has not passed in this state, the program is returned to S21.

Due to the foregoing, when the vehicle is stopped or parked, the drying air blowing mode is previously conducted. Therefore, the offensive smell components can be previously discharged outside the vehicle, and it is possible to conduct air conditioning in the passenger compartment simultaneously when the air conditioner for vehicle use is started.

Next, the fourth embodiment will be explained below. In the above embodiment, blowout of the offensive smell components is prevented by drying the cooler 2 before the air conditioner for vehicle use is set in motion. However, in this embodiment, the operation is conducted as follows. Before the air conditioner for vehicle use is set in motion, in the blowing mode in which the cold wind side air mixing door 6, the hot wind side air mixing door 7, the cold wind door 12 and the rear cold wind side air mixing door 14 are totally closed, the compressor, that is, the vapor compression type refrigerating machine is operated and the refrigerating capacity (the air conditioning capacity) is generated in the cooler 2 so that the temperature of the cooler 2 can be lowered, and when the surface of the cooler 2 gets wet so that the offensive smell components cannot be emitted from the surface of the cooler 2, the above blowout mode is released and an air conditioned wind is blown out into the passenger compartment.

Due to the foregoing, when the vehicle is stopped or parked, the offensive smell components can be previously discharged outside the vehicle, and further it is possible to get the surface of the cooler 2 wet so that the offensive smell components can not be emitted from the surface of the cooler 2. Therefore, it is possible to prevent an unpleasant feeling from being given to a passenger when the passenger gets into the vehicle.

Figure 15:
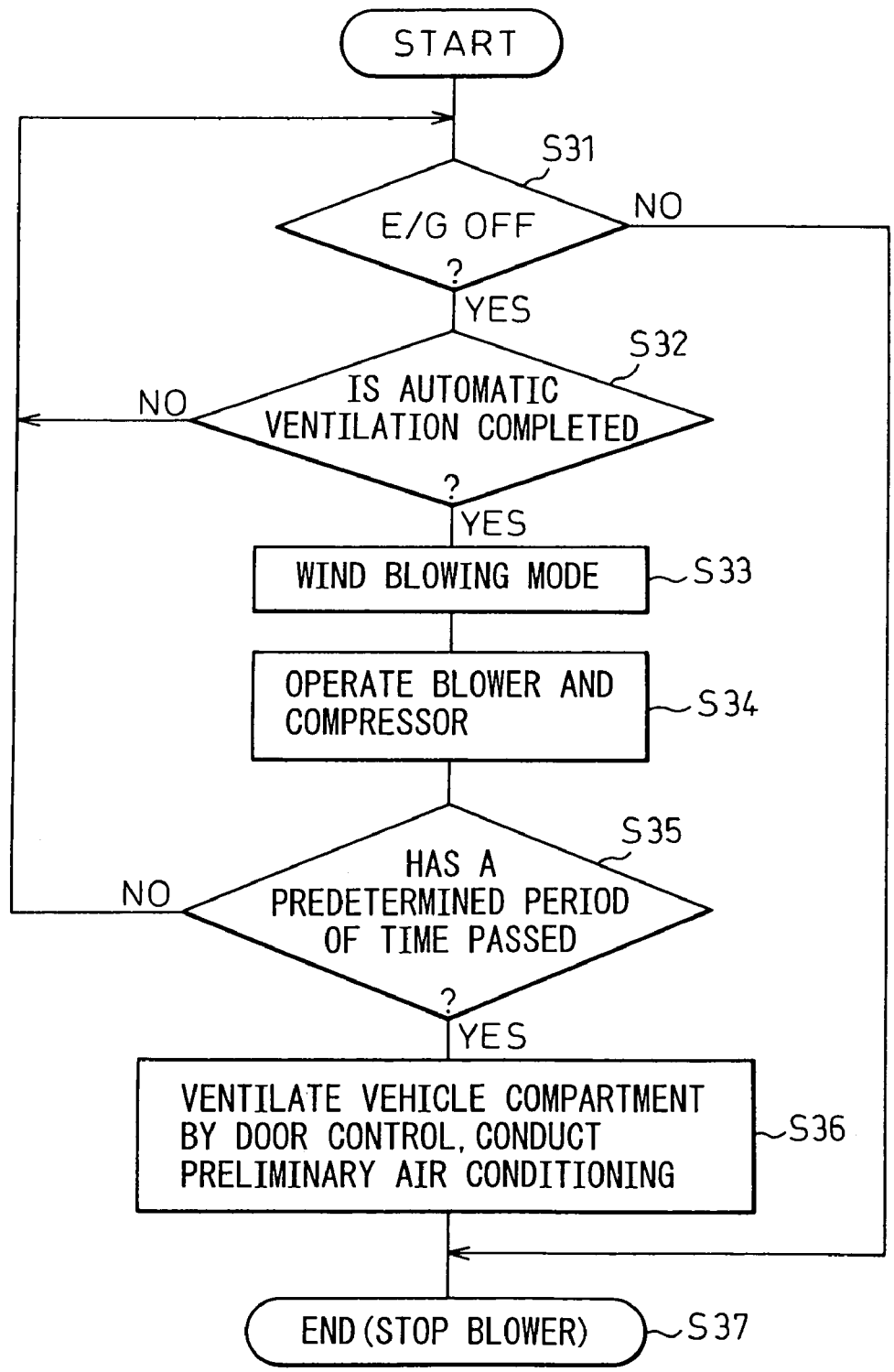
FIG. 15 is a flow chart showing operation of the air conditioner for vehicle use of the fourth embodiment of the present invention.

FIG. 15 is a flow chart showing an example of controlling the air conditioner for vehicle use of this embodiment. This flow chart is executed at all times while electric power is being supplied from the battery.

According to whether the ignition switch is turned on or off, it is judged whether or not the engine is stopped (S31). In the case where the engine is stopped, it is judged whether or not a ventilating motion of the automatic ventilating device has stopped (S32). In this connection, when the engine is being operated, control shown in FIG. 15 is stopped.

In this connection, the automatic ventilating device of this embodiment is automatically stopped when a predetermined period of time has passed from the start of the automatic ventilating device. Alternatively, the automatic ventilating device of this embodiment is automatically stopped when a detection value of the sensor for detecting the parameter, which rises according to the rise of the compartment temperature, such as a detection value of the compartment temperature sensor, a detection value of the sunshine sensor or a detection value of the infrared ray sensor, decreases to be lower than a predetermined value.

When the automatic ventilation conducted by the automatic ventilating device is completed, the mode is set at the air blowing mode in which the cold wind side air mixing door 6, the hot wind side air mixing door 7, the cold wind door 12 and the rear cold wind side air mixing door 14 are totally closed (S33), and the blower 21 and the compressor are operated (S34). In this connection, before the automatic ventilation of the automatic ventilation device is completed, the program returns to S31.

Then, it is judged whether or not a predetermined period of time has passed in this state (S35). When the predetermined period of time has passed, the air conditioner for vehicle use is operated in the state of the blowout mode which is determined according to the target blowout temperature TAO, and the preliminary air conditioning is conducted for a predetermined period of time (S36). When the predetermined period of time has not passed, the program returns to S31.

In this connection, the preliminary air conditioning is defined as operation of the air conditioner for vehicle use which is conducted so that the compartment temperature can become a predetermined value when the compressor is set in motion before a passenger gets into the vehicle.

In this connection, in FIG. 15, the mode is set in the air blowout mode after the ventilation conducted by the automatic ventilating device is completed. However, in this embodiment, in the preliminary air conditioning mode, in which the compartment is previously air-conditioned before a passenger gets into the vehicle, the surface of the cooler 2 is made wet by condensed water in the air blowing mode in which the cold wind side air mixing door 6, the hot wind side air mixing door 7, the cold wind door 12 and the rear cold wind side air mixing door 14 are totally closed. Therefore, this embodiment can be also applied to a vehicle not having the automatic ventilating device.

In FIG. 15, in the air blowing mode in which the cold wind side air mixing door 6, the hot wind side air mixing door 7, the cold wind door 12 and the rear cold wind side air mixing door 14 are totally closed, the compressor is operated. When this operation time has passed a predetermined period of time, the air blowing mode is released and an air-conditioned wind is blown out in the compartment. However, it should be noted that the present embodiment is not limited to the above specific embodiment. For example, the following variation may be adopted. A quantity of water attaching onto the surface of the cooler 2 is monitored by a humidity sensor. When the quantity of water attaching onto the surface of the cooler 2 exceeds a predetermined value or when the temperature of the cooler 2 (the temperature of air flowing right below the cooler 2) is decreased to a value not higher than a predetermined value, the above air blowing mode is released and an air-conditioned wind is blown out into the compartment.

Figure 16:
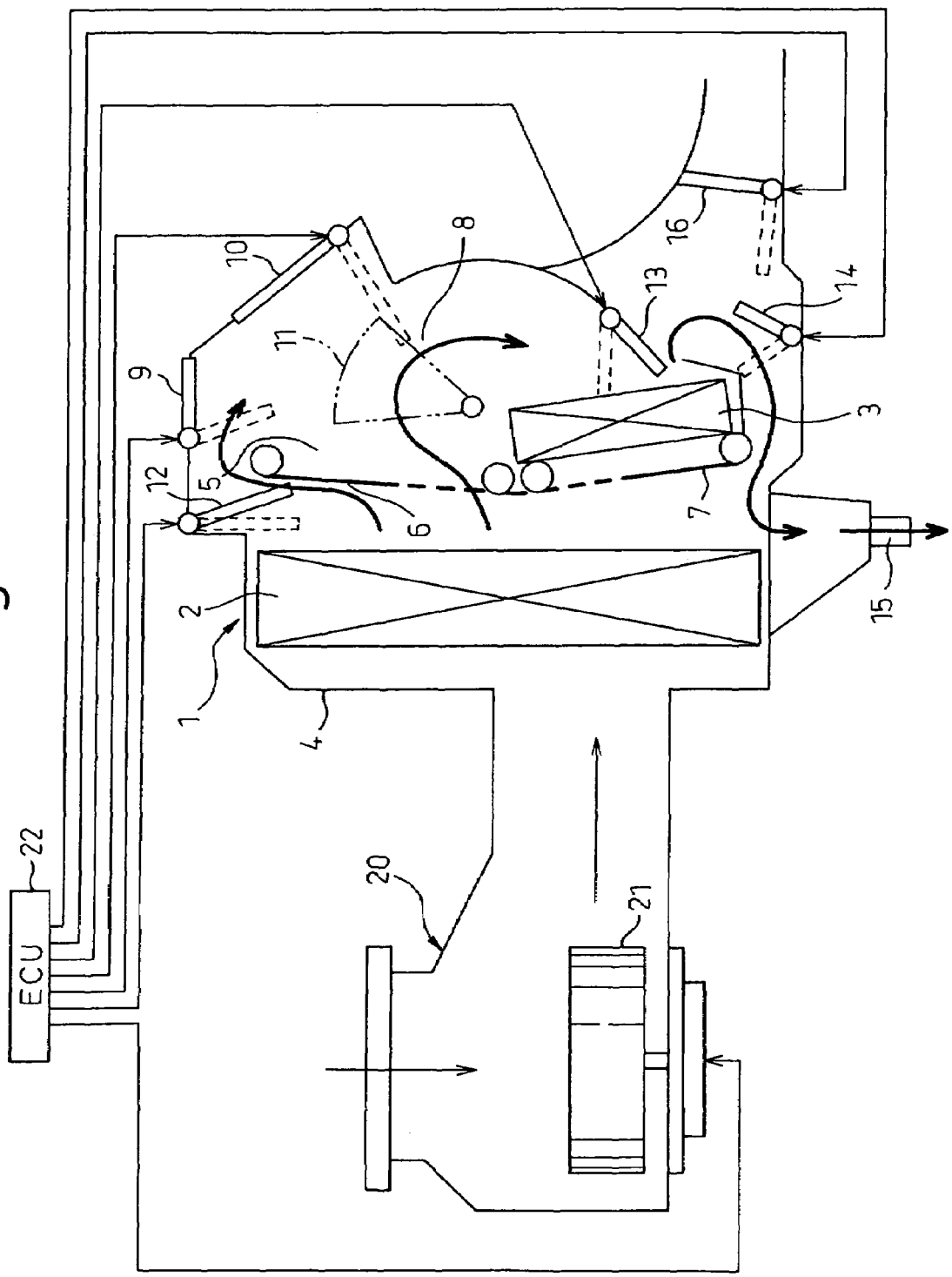
FIG. 16 is a view showing a model of the air conditioner for vehicle use of the fifth embodiment of the present invention.

Next, the fifth embodiment will be explained. In the first to the fourth embodiments, while the cold wind side air mixing door 6, the hot wind side air mixing door 7, the cold wind door 12 and the rear cold wind side air mixing door 14 are totally closed, the drying air blowing mode or the air blowing mode is executed. However, in this embodiment, as shown in FIG. 16, while the blowout mode doors 9 to 11 and the rear door 16 are totally closed, the drying air blowing mode or the air blowing mode is executed.

Due to the foregoing, in the same manner as that of the aforementioned embodiment, air which has passed through the cooler 2 cannot flow anywhere. Therefore, the air can be discharged outside from the discharge port 15.

The timing of operating the drying air blowing mode or the air blowing mode may be the same as in the first, the second, the third or the fourth embodiment. An example is shown in FIG. 17 as follows.

Figure 17:
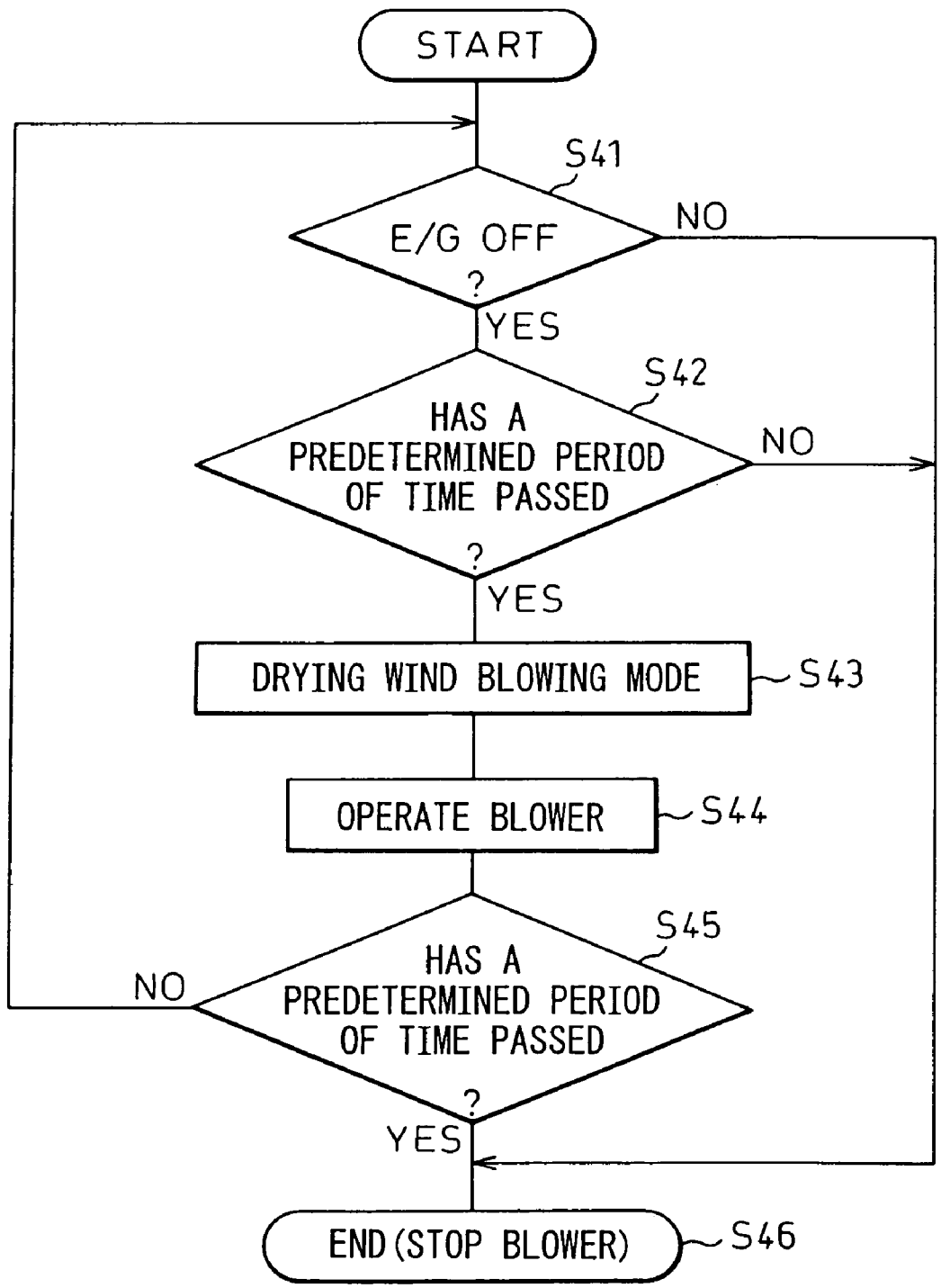
FIG. 17 is a flow chart showing operation of the air conditioner for vehicle use of the fifth embodiment of the present invention.

The flow chart shown in FIG. 17 is executed at all times as long as electric power is supplied from the battery.

According to whether the ignition switch, which is a starting switch of the vehicle, is turned on or off, that is, according to whether the voltage generated in the ignition switch exceeds a predetermined value or not, it is judged whether the engine is stopped or not (S41). In the case where the engine is stopped, it is judged whether or not a predetermined period of time has passed from the stoppage of the engine (S42). In the case where the engine is operating, control shown in FIG. 17 is stopped.

When the predetermined period of time has passed from the time of stoppage of the engine, the blowout mode doors 9 to 11 and the rear door 16 are totally closed so that the mode can be set at the drying air blowing mode (S43), and the blower 21 is set in motion (S44).

It is judged whether or not a predetermined period of time has passed in this state (S45). When the predetermined period of time has passed in this state, the blower 21 is stopped (S46). When the predetermined period of time has not passed in this state, the program returns to S41.

Figure 18:
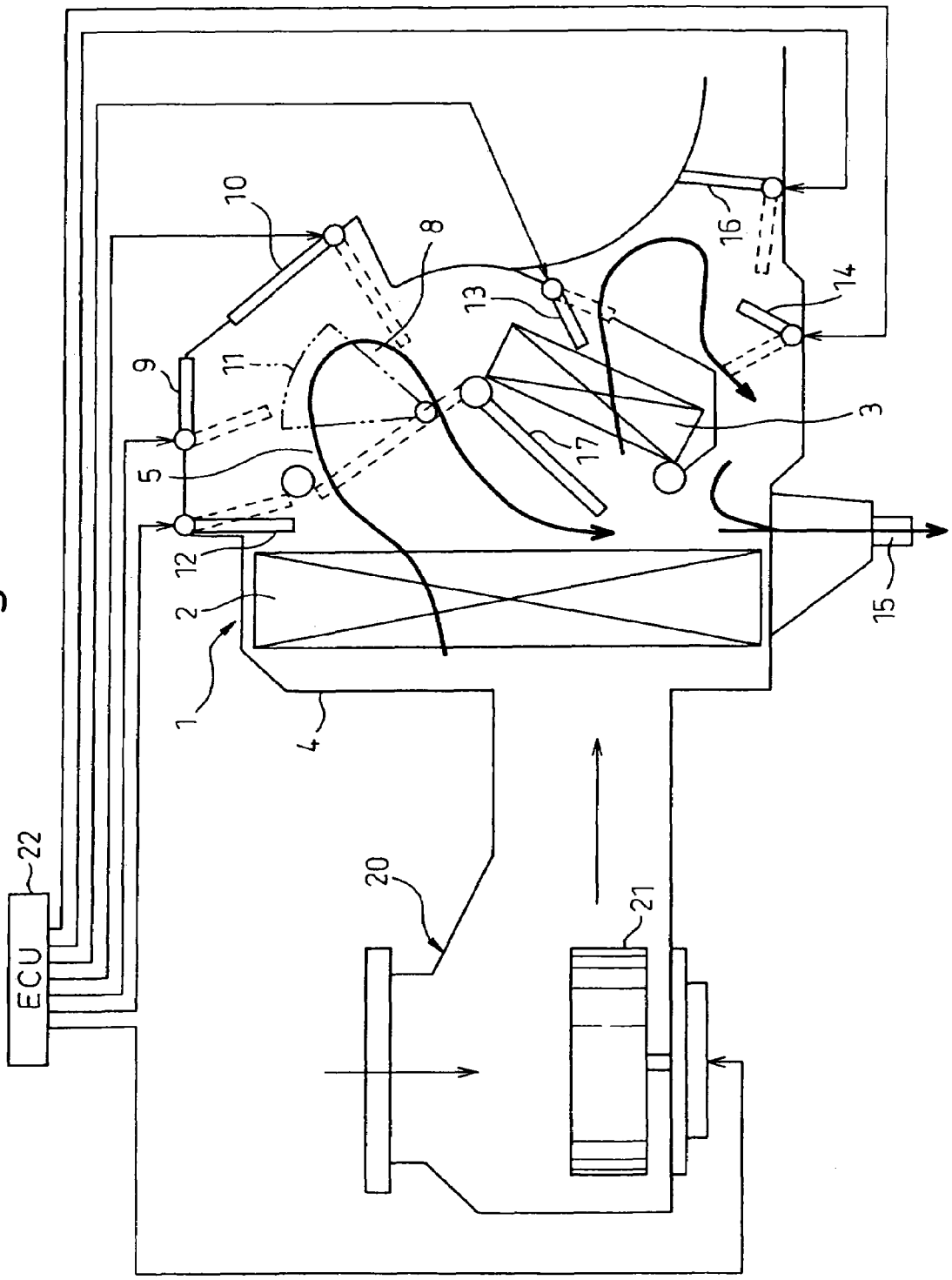
FIG. 18 is a view showing a model of the air conditioner for vehicle use of the sixth embodiment of the present invention.

Next, the sixth embodiment will be explained below. This embodiment is a variation of the first to the fourth embodiment. Specifically, as shown in FIG. 18, the film-shaped air mixing doors 6, 7 are abolished, and one piece of the plate-shaped air mixing door 17 is provided, which adjusts quantities of the hot and the cold wind.

Figure 19:
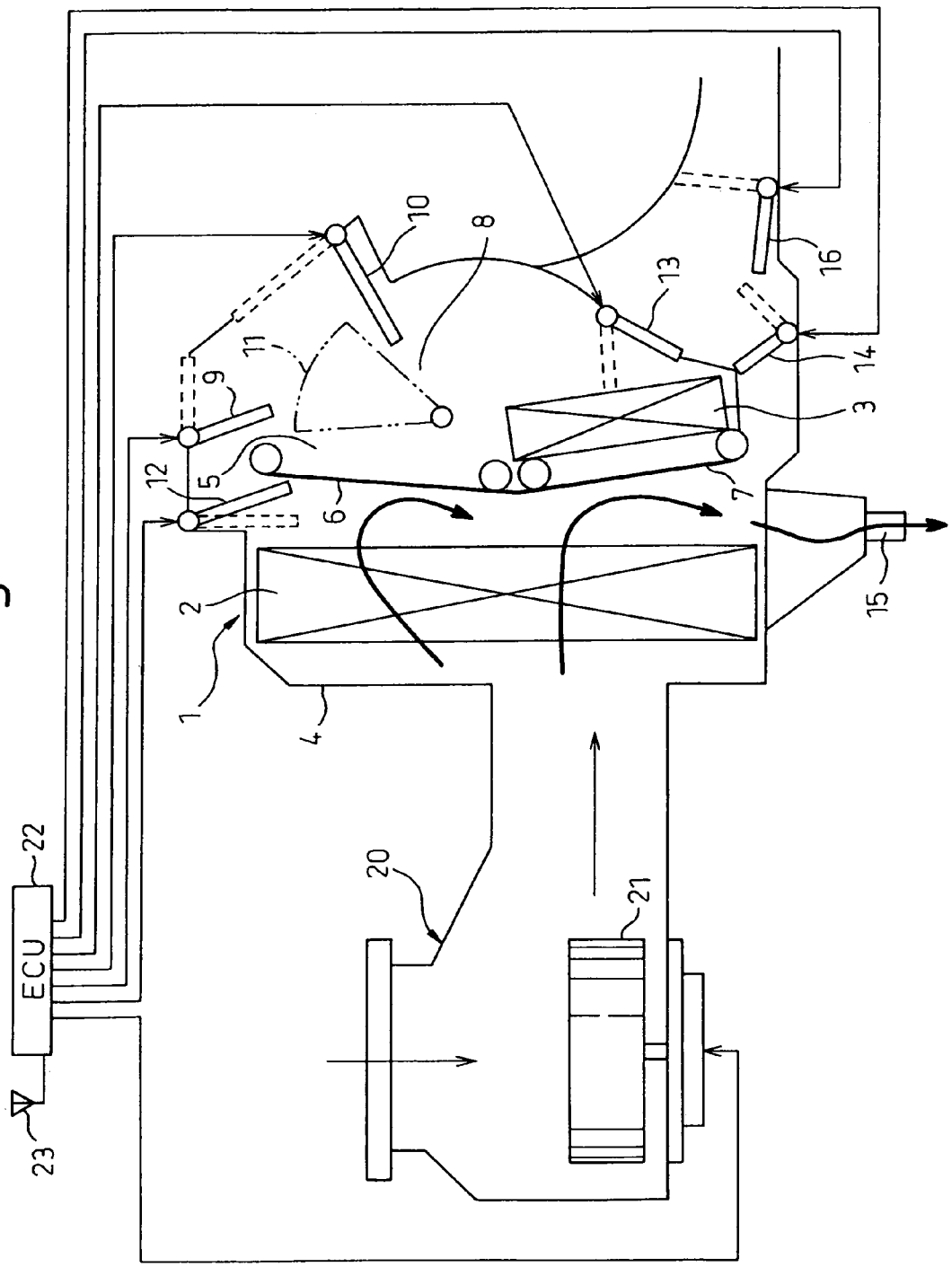
FIG. 19 is a view showing a model of the air conditioner for vehicle use of the seventh embodiment of the present invention.

Next, the seventh embodiment will be explained below. In this embodiment, as shown in FIG. 19, the electronic control device 22 is provided with the remote executing device 23 for executing the air blowing mode such as the drying air blowing mode when a wireless signal, which is sent from a remote control means such as a remote control key or a portable terminal device, is received. Further, the remote executing device 23 executes the drying air blowing mode when it receives a signal from the remote control device.

Usually, the remote control key and the portable terminal device are operated when the vehicle is stopped. Therefore, in this embodiment, when the vehicle is stopped, the drying air blowing mode and others are executed.

In this connection, the remote executing device 23 includes: a receiving portion for receiving a wireless signal sent from the remote control device; and an amplifier portion, which is built in the electronic control device 22, for amplifying a received signal.

In this connection, in FIG. 19, the remote executing device 23 and the electronic control device 22 are integrated with each other into one body. However, it should be noted that the present invention is not limited to the above specific embodiment.

Next, the eighth embodiment will be explained below. In the above embodiment, after the blower 21 is operated in the drying air mode, the blower 21 is stopped when a predetermined period of time has passed. However, in this embodiment, a quantity of water attaching onto the surface of the cooler 2 is detected by the water quantity detecting means such as a moisture sensor, and the blower 21 is stopped when the quantity of water attaching onto the surface of the cooler 2 is decreased to a value not more than a predetermined value.

Figure 20:
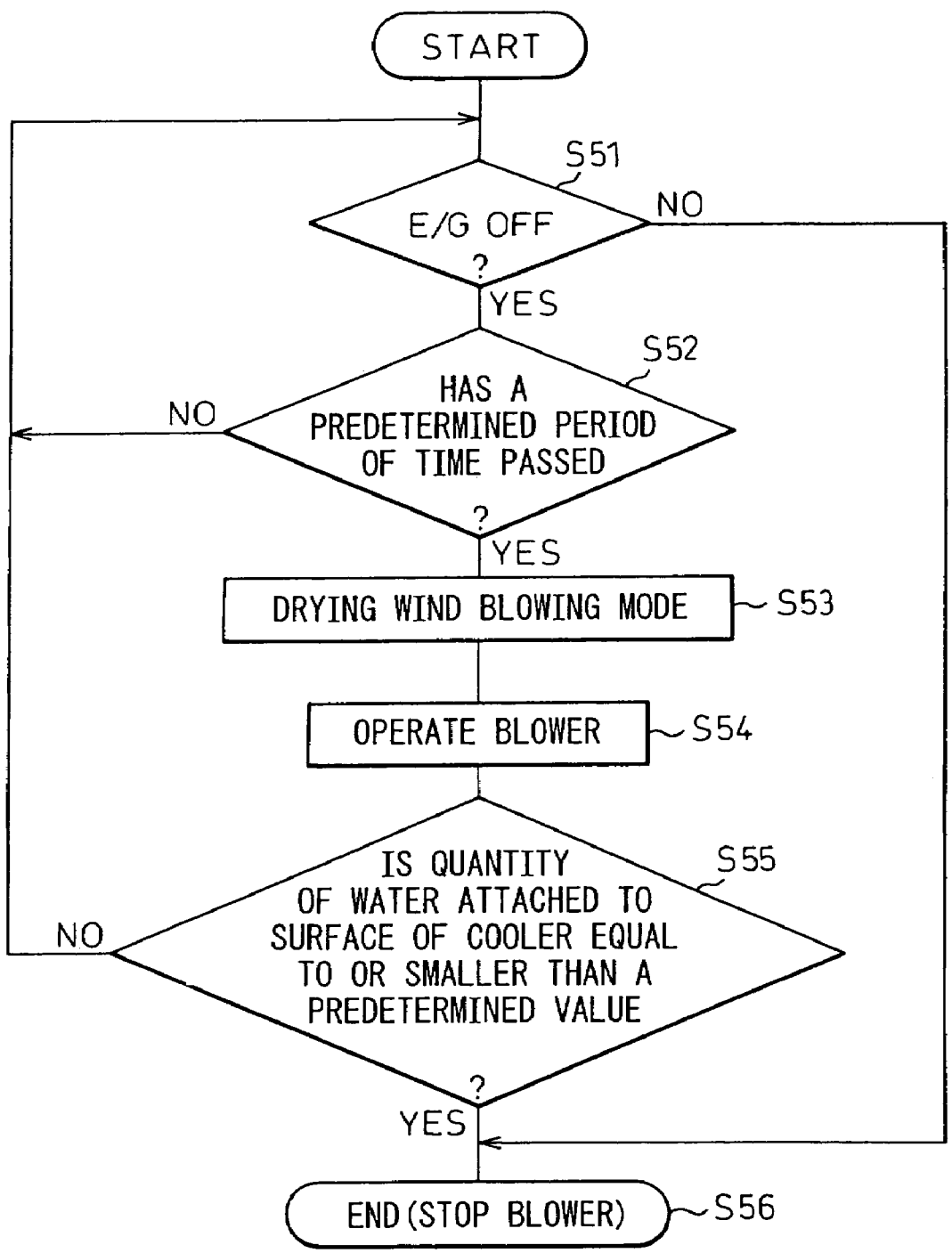
FIG. 20 is a flow chart showing operation of the air conditioner for vehicle use of the eighth embodiment of the present invention.

In this connection, FIG. 20 is a flow chart showing an example of control of the air conditioner for vehicle use of the embodiment of the present invention. This flow chart is executed at all times as long as electric power is supplied from the battery.

According to whether the ignition switch, which is a starting switch of the vehicle, is turned on or off, it is judged whether the engine is stopped or not (S51). In the case where the engine is stopped, it is judged whether or not a predetermined period of time has passed from the stoppage of the engine (S52). In the case where the engine is operating, the control shown in FIG. 20 is stopped.

When the predetermined period of time has passed from the time of stoppage of the engine, the mode is set at the drying air blowing mode in which the cold wind side air mixing door 6, the hot wind side air mixing door 7, the cold wind door 12 and the rear cold wind side air mixing door 14 are totally closed (S53), and the blower 21 is set in motion (S54). In this connection, when the predetermined period of time has not passed from the stoppage of the engine, the program returns to S51.

Then, a quantity of water attached to the surface of the cooler 2 is detected by the moisture sensor, and it is judged whether or not the quantity of water attaching to the surface of the cooler 2 is decreased to a value not more than a predetermined value (S55). When the quantity of water attached to the surface of the cooler 2 is decreased to the value not more than the predetermined value, the blower 21 is stopped (S56). When the quantity of water attached to the surface of the cooler 2 is larger than the predetermined value, the program returns to S51.

In this connection, in FIG. 20, the present embodiment is applied to the air conditioner for vehicle use of the first embodiment. However, the present embodiment is not limited to the above specific embodiment. It is possible to apply the present embodiment to the second, the third, the fifth, the sixth and the seventh embodiment.

Next, the ninth embodiment will be explained below. In the first to the eighth embodiments, when the vehicle (the engine) is stopped, the drying air blowing mode and others are executed. However, in the present embodiment, and in the tenth and the eleventh embodiments, the drying air blowing mode and others are executed after the engine is started.

Accordingly, in this embodiment, it becomes unnecessary to provide an exclusively used air passage and an opening and closing door for opening and closing the air passage which are provided to compose the wind passage for drying the cooler 2. It becomes possible to discharge air, which has passed through the cooler 2 so as to dry it and contains a large quantity of the offensive smell components, outside the vehicle by utilizing the existing equipment. Therefore, the offensive smell of the air-conditioned wind blown out from the air conditioner can be suppressed while an increase in the manufacturing cost of the air conditioner (air conditioner casing) is being prevented.

Figure 21:
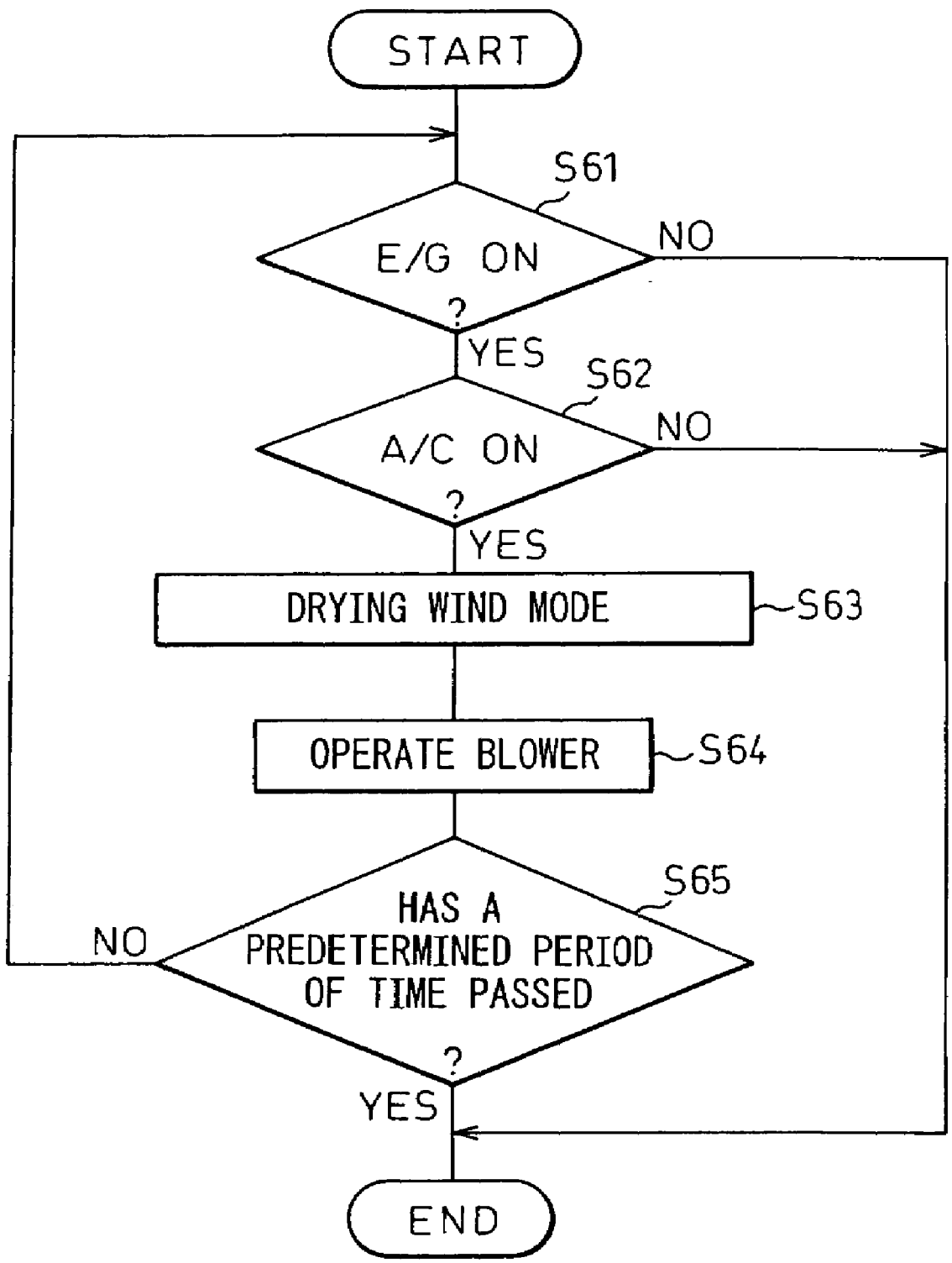
FIG. 21 is a flow chart showing operation of the air conditioner for vehicle use of the ninth embodiment of the present invention.

In this connection, FIG. 21 is a flow chart showing an example of control of the air conditioner for vehicle use described above. This flow chart is executed at all times as long as electric power is supplied from the battery.

According to whether the ignition switch, which is a starting switch of the vehicle, is turned on or off, it is judged whether the engine is stopped or not (S61). In the case where the engine is operated, it is judged whether the starting switch (A/C switch) of the air conditioner for vehicle use is turned on or off (S62).

When the starting switch of the air conditioner for vehicle use is turned on, the mode is set at the drying air blowing mode in which the cold wind side air mixing door 6, the hot wind side air mixing door 7, the cold wind door 12 and the rear cold wind side air mixing door 14 are totally closed (S63), and the blower 21 is set in motion (S64).

In this connection, when the engine is not operated or when the starting switch of the air conditioner for vehicle use is turned off, control shown in FIG. 21 is stopped.

Then, it is judged whether or not a predetermined period of time has passed in this state (S65). When the predetermined period of time has passed in this state, the blower 21 is stopped, and control shown in FIG. 21 is stopped. On the other hand, when the predetermined period of time has not passed in this state, the program returns to S61.

In this connection, after control shown in FIG. 21 has been stopped, the normal air conditioning control mode is conducted in which the voltage impressed upon the electric motor for driving the blower 21, the degrees of the openings of the air mixing doors 6, 7, 13, 14 and the degrees of the openings of the blowout mode doors 9 to 11 are controlled according to the target air blowout temperature TAO.

In this embodiment, the drying air blowing mode is executed in which the cold wind side air mixing door 6, the hot wind side air mixing door 7, the cold wind door 12 and the rear cold wind side air mixing door 14 are totally closed. However, it should be noted that the present invention is not limited to the above specific embodiment. The drying air blowing mode may be executed while the blowout mode doors 9 to 11 and the rear door 16 are totally closed.

In the case of the control shown in FIG. 21, in the drying air blowing mode, after the blower 21 is set in motion, the blower 21 is stopped when a predetermined period of time has passed. However, the present invention is not limited to the above specific embodiment. For example, a quantity of water attached to the surface of the cooler 2 is detected by the water quantity detecting means such as a moisture sensor, and when the quantity of water attached to the surface of the cooler 2 is decreased to a value not more than a predetermined value, the blower 21 may be stopped.

Next, the tenth embodiment will be explained below. In the ninth embodiment, when the starting switch of the air conditioner for vehicle use is turned on under the condition that the engine is operating, the drying air blowing mode is executed. However, in this embodiment, the drying air blowing mode is executed when the starting switch of the air conditioner for vehicle use is turned on under the condition that the engine is operating and when the time passed from the stoppage of the air conditioner for vehicle use, that is, when the time passed from the stoppage of the compressor to the present time exceeds a predetermined period of time, the drying air blowing mode is executed.

As described before, in the period of time from when a quantity of water attached to the surface of the cooler 2 is decreased to a value not more than a predetermined value to when the surface of the cooler 2 is dried, an offensive smell tends to be generated by the cooler 2. Therefore, in the first to the third embodiment, the generation of the offensive smell is prevented by drying the surface of the cooler 2. In the fourth embodiment, the generation of the offensive smell is prevented by increasing the quantity of water attached to the surface of the cooler 2 to a value not less than a predetermined value.

Therefore, according to the present embodiment, the drying air blowing mode is executed as follows. In the case where the air conditioner for vehicle use is operated, that is, in the case where the compressor is operated, as a quantity of water attached to the surface of the cooler 2 is usually larger than a predetermined quantity of water, attention is paid to the fact that a quantity of water larger than the predetermined quantity of water remains on the surface of the cooler 2, and the drying air blowing mode is executed at the time when the time passed from when the compressor was stopped to the present time exceeds a period of time in which a quantity of water, which is larger than the predetermined quantity of water, can remain on the surface of the cooler 2.

Figure 22:
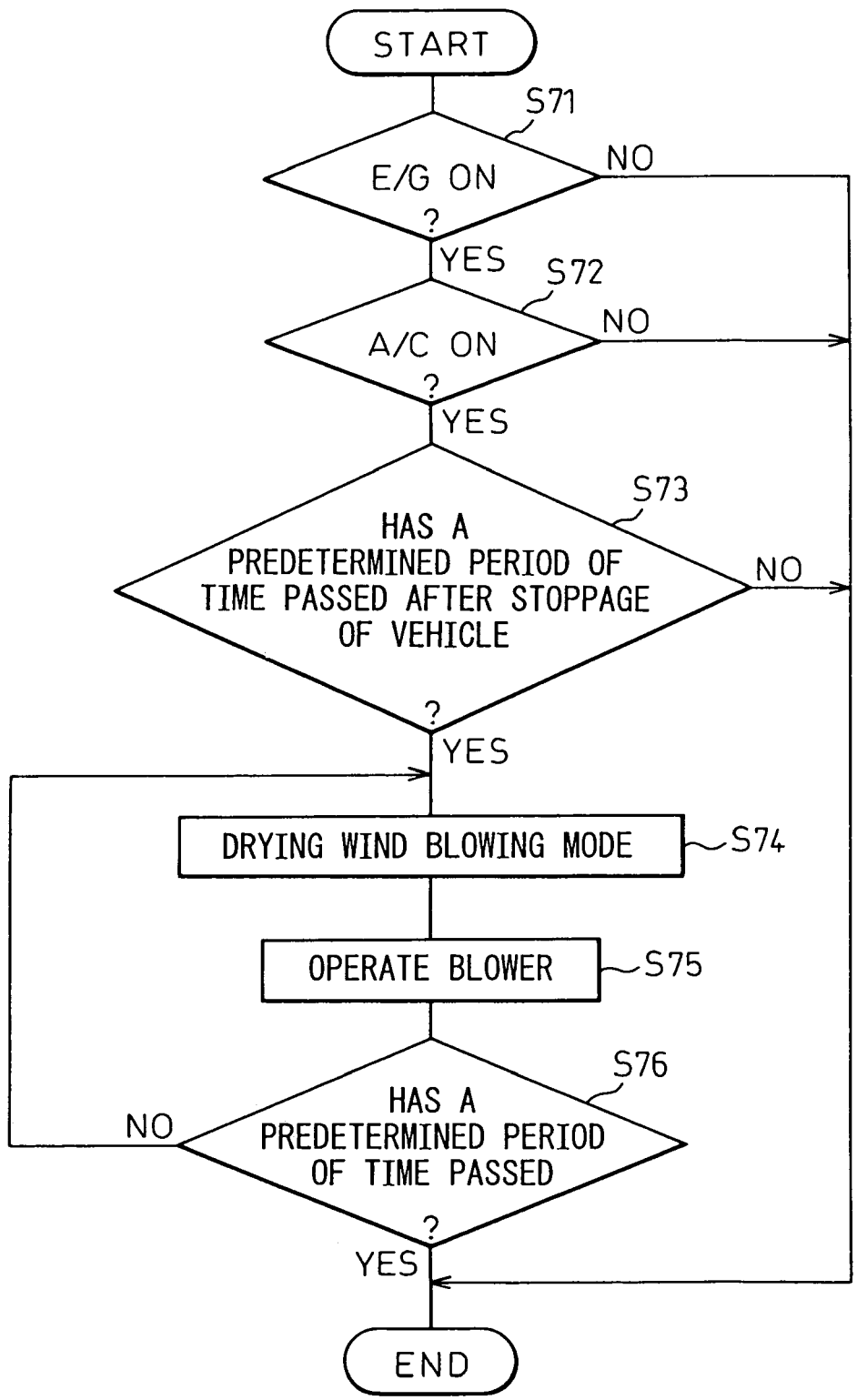
FIG. 22 is a flow chart showing operation of the air conditioner for vehicle use of the tenth embodiment of the present invention.

In this connection, FIG. 22 is a flow chart showing an example of control of the air conditioner for vehicle use of the embodiment described above. This flow chart is executed at all times as long as electric power is supplied from the battery.

According to whether the ignition switch, which is a starting switch of the vehicle, is turned on or off, it is judged whether the engine is stopped or not (S71). In the case where the engine is operating, it is judged whether the starting switch of the air conditioner for vehicle use is turned on or off (S72).

In the case where the starting switch of the air conditioner for vehicle use is turned on, it is judged whether or not the time passed from the stoppage of the compressor, that is, from the stoppage of the vehicle to the present time exceeds the predetermined period of time (S73). When the time passed from the stoppage of the vehicle to the present time exceeds the predetermined period of time, the cold wind side air mixing door 6, the hot wind side air mixing door 7, the cold wind door 12 and the rear cold wind side air mixing door 14 are totally closed so that the operation mode can be set at the drying air blowing mode (S74), and the blower 21 is set in motion (S75).

In this connection, when the engine is not operated or when the starting switch of the air conditioner for vehicle use is turned off or when the time passed from the stoppage of the vehicle to the present time has not exceeded the predetermined period of time, the control shown in FIG. 22 is stopped.

In this connection, the aforementioned predetermined period of time is found by experiment. In the electronic control device of the present embodiment, a non-volatile memory, which stores the stoppage time of the compressor, that is, the stoppage time of the engine, is built in. In this embodiment, thus stored stoppage time and the time when the ignition switch was turned on are compared with each other, so that the passing time from the stoppage of the vehicle to the present time can be found.

Then, it is judged whether or not a predetermined period of time has passed in this state (S76). When the predetermined period of time has passed in this state, the blower 21 is stopped and control shown in FIG. 22 is stopped. After that, the normal air conditioning control mode is conducted. When the predetermined period of time has not passed in this state, the program returns to S74.

In this embodiment, the drying air blowing mode is executed in which the cold wind side air mixing door 6, the hot wind side air mixing door 7, the cold wind door 12 and the rear cold wind side air mixing door 14 are totally closed. However, the present embodiment is not limited to the above specific embodiment. The drying air blowing mode may be executed while the blowout mode doors 9 to 11 and the rear door 16 are totally closed.

As described above, the present embodiment is characterized in that: the drying air blowing mode is executed at the time when the time passed from when the compressor was stopped to the present time exceeds a period of time in which a quantity of water, which is larger than the predetermined quantity of water, can remain on the surface of the cooler 2. Of course, the aforementioned present embodiment can be applied to the first to the third embodiment and the fifth to the eighth embodiment.

In control shown in FIG. 22, the drying air blowing mode is conducted in such a manner that, after the blower 21 was started, the blower 21 is stopped when a predetermined period of time has passed. However, the present invention is not limited to the above specific embodiment. For example, a quantity of water attached to the surface of the cooler 2 is detected by the water quantity detecting means such as a moisture sensor, and the blower 21 may be stopped when the quantity of water attached to the surface of the cooler 2 has decreased to a value not more than a predetermined value.

Next, the eleventh embodiment will be explained below. This embodiment is a variation of the tenth embodiment. In the tenth embodiment, when the time passed from the stoppage of the vehicle to the present time exceeds a predetermined period of time, it is assumed that a quantity of water attached to the surface of the cooler 2 is decreased to a predetermined value that is a threshold value at which an offensive smell is generated or not generated, and the drying air blowing mode is executed. However, according to this embodiment, the quantity of water attached to the surface of the cooler 2 is monitored by a moisture sensor, and the drying air blowing mode is executed when the quantity of water attached to the surface of the cooler 2 is decreased to a predetermined quantity of water.

Due to the foregoing, according to this embodiment, it is possible to positively prevent the drying air blowing mode from being executed over an unnecessary long period of time, which can reduce the electric power consumption of the air conditioner for vehicle use.

Figure 23:
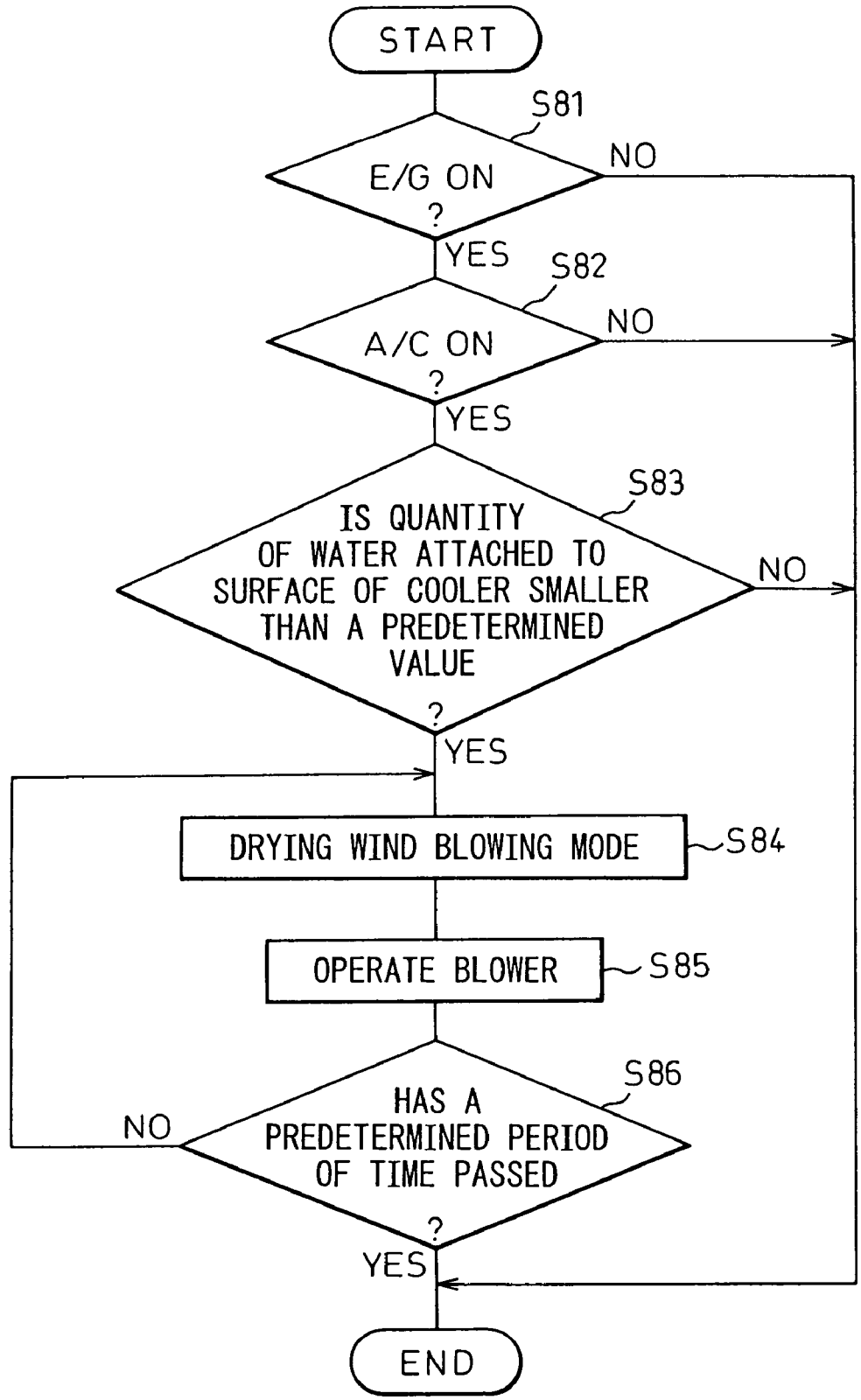
FIG. 23 is a flow chart showing operation of the air conditioner for vehicle use of the eleventh embodiment of the present invention.

In this connection, FIG. 23 is a flow chart showing an example of control of the air conditioner for vehicle use of the embodiment described above. This flow chart is executed at all times as long as electric power is supplied from the battery.

According to whether the ignition switch, which is a starting switch of the vehicle, is turned on or off, it is judged whether the engine is stopped or not (S81). In the case where the engine is operating, it is judged whether the starting switch of the air conditioner for vehicle use is turned on or off (S82).

In the case where the starting switch of the air conditioner for vehicle use is turned on, it is judged whether or not the quantity of water attached to the surface of,the cooler 2 is decreased to a predetermined value (S83). When the quantity of water attached to the surface of the cooler 2 is decreased to the predetermined value, the drying air blowing mode is executed in which the cold wind side air mixing door 6, the hot wind side air mixing door 7, the cold wind door 12 and the rear cold wind side air mixing door 14 are totally closed (S84), and the blower 21 is driven (S85).

In this connection, when the engine is not operated or when the starting switch of the air conditioner for vehicle use is turned off or when a quantity of water attached to the surface of the cooler 2 is not decreased to the predetermined value, the control shown in FIG. 23 is stopped.

Then, it is judged whether or not a predetermined period of time has passed in this state (S86). When the predetermined period of time has passed in this state, the blower 21 is stopped and control shown in FIG. 23 is stopped. After that, the normal air conditioning control mode is conducted. When the predetermined period of time has not passed in this state, the program returns to S84.

In this embodiment, the drying air blowing mode is executed in which the cold wind side air mixing door 6, the hot wind side air mixing door 7, the cold wind door 12 and the rear cold wind side air mixing door 14 are totally closed. However, the present embodiment is not limited to the above specific embodiment. The drying air blowing mode may be executed while the blowout mode doors 9 to 11 and the rear door 16 are totally closed.

As described above, the present embodiment is characterized in that: the drying air blowing mode is executed when the quantity of water attached to the surface of the cooler 2 is decreased to the predetermined quantity. Of course, the aforementioned present embodiment can be applied to the first to the third embodiment and to the fifth to the eighth embodiment.

In control shown in FIG. 23, the drying air blowing mode is conducted in such a manner that after the blower 21 was started, the blower 21 is stopped when a predetermined period of time has passed. However, the present invention is not limited to the above specific embodiment. In the same manner as that of S83, a quantity of water attaching onto the surface of the cooler 2 may be detected by the water quantity detecting means such as a moisture sensor, and the blower 21 may be stopped when the quantity of water attaching onto the surface of the cooler 2 has decreased to a value not more than a predetermined value.

Finally, still another embodiment will be explained below. In the above embodiment, whether or not the engine is stopped is judged by the state of the ignition switch, however, it should be noted that the present invention is limited to the above specific embodiment. For example, when the engine speed is zero, it is possible to judge that the engine is stopped.

Further, in the first to the third embodiment and in the fifth to the eleventh embodiment, for example, an automatic ventilating device may be provided which automatically conducts ventilation in the vehicle compartment when a parameter such as a detection value of the compartment temperature sensor, a detection value of the sunshine sensor or a detection value of the infrared ray sensor, which increases according to an increase in the compartment air temperature, exceeds a predetermined value and also when the vehicle is stopped, and the drying air blowing mode may be executed and linked with the operation of the automatic ventilating device.

In this case, "The drying air blowing mode is executed and linked with the operation of the automatic ventilating device." includes the following three cases.

(1) The drying air blowing mode is executed immediately before the automatic ventilating device is operated.

(2) The drying air blowing mode is executed simultaneously when operation of the automatic ventilating device is started.

(3) The drying air blowing mode is executed after operation of the automatic ventilating device is started.

In the case where the automatic ventilating device is provided, the drying air blowing mode may be automatically executed at a predetermined time by the timer.

In the first to the fifth embodiment and in the seventh to the eleventh embodiment, the film-shaped air mixing doors 6, 7 are used, however, the present invention is not limited to the above specific embodiment. The air mixing doors 6, 7 may be composed of a plate-shaped door.

In the above embodiment, the discharge port 15 for discharging water containing condensed water is made to be the communicating port described in the claim of the invention, however, the present embodiment is not limited to the above specific embodiment. A communicating port, which is exclusively used, may be provided.

While the invention has been described by reference to specific embodiments chosen for purposes of illustration, it should be apparent that numerous modifications could be made thereto by those skilled in the art without departing from the basic concept and scope of the invention.

The invention claimed is:

1. An air conditioner for vehicle use comprising:
   a blower (21) for blowing air into a vehicle compartment;
   a cooler (2) for cooling the air which has been blown by the blower (21);
   a heater (3) for heating the air which has been blown by the blower (21);
   an air conditioning casing (4) for accommodating the cooler (2) and heater (3), having a heater bypass passage (5) to make a detour of the heater (3) so as to let the air flow to the downstream side;
   a cold wind side air mixing door (6) for controlling a state of communication of the heater bypass passage (5), the cold wind side air mixing door (6) being provided in the air conditioning casing (4); and
   a hot wind side air mixing door (7) for controlling a quantity of the wind passing through the heater (3), the hot wind side air mixing door (7) being provided in the air conditioning casing (4), wherein
   the cooler (2) is arranged on the upstream side of the air flow of the heater (3) and the entrance portion of the heater bypass passage (5),
   the air conditioner for vehicle use further comprising:
   a communicating port (15) for communicating the inside with the outside of the air conditioning casing (4), the communicating port (15) being arranged in the air conditioning casing (4) on the upstream side of the air flow of the heater (3) and the entrance portion of the heater bypass passage (5); and
   an air blowing control means (S3, S4, S13, S14, S23, S24, S33, S34) for conducting an air blowing mode in which the blower (21) is operated under the condition that both the air mixing doors (6, 7) are closed.

2. An air conditioner for vehicle use according to claim 1, further comprising a means for judging whether or not a vehicle is stopped (S1, S21, S31, S41), wherein
   the air blowing control means (S3, S4, S13, S14, S23, S24, S33, S34, S43, S44) executes the air blowing mode when the means for judging whether or not the vehicle is stopped (S1, S21, S31, S41) judges that the vehicle is stopped.

3. An air conditioner for vehicle use according to claim 2, further comprising a means (S2, S12, S42) for executing the air blowing mode when a predetermined period of time has passed after the vehicle was stopped.

4. An air conditioner for vehicle use according to claim 3, further comprising an air blowing stop means (S5, S16, S25, S35, S45) for stopping the air blowing mode when a predetermined period of time has passed after the air blowing control means (S3, S4, S13, S14, S23, S24, S33, S34, S43, S44) executed the air blowing mode.

5. An air conditioner for vehicle use according to claim 3, further comprising an air blowing stop means (S55, S56) for stopping the air blowing mode when a quantity of water attached to a surface of the cooler (2) is decreased to a value not more than a predetermined value after the air blowing control means (S3, S4, S13, S14, S23, S24, S33, S34, S43, S44) executed the air blowing mode.

6. An air conditioner for vehicle use according to claim 1, further comprising a remote executing means (23) for executing the air blowing mode when a signal is received from a remote operating means.

7. An air conditioner for vehicle use according to claim 2, further comprising an automatic ventilation means for automatically ventilating a vehicle compartment when a stoppage of the vehicle is judged by a means (S1, S21, S31, S41) for judging whether or not the vehicle is stopped.

8. An air conditioner for vehicle use according to claim 1, further comprising a means (S34) for generating a refrigerating capacity in the cooler (2) while the air blowing mode is being executed.

9. An air conditioner for vehicle use according to claim 1, further comprising a means (S73 to S75, S83 to S85) for executing the air blowing mode when a quantity of water attached to the surface of the cooler (2) is decreased to a value not more than a predetermined value.

* * * * *